US012699751B2

(12) United States Patent
Yuan et al.

(10) Patent No.: US 12,699,751 B2
(45) Date of Patent: Aug. 4, 2026

(54) FINGERPRINT SIMILARITY BASED SAMPLE ANALYSIS

(71) Applicant: AGILENT TECHNOLOGIES, INC., Santa Clara, CA (US)

(72) Inventors: Zhi-Quan Yuan, Santa Clara, CA (US); Dong Fang, Santa Clara, CA (US); Shumin Jing, Santa Clara, CA (US); Yunfei Li, Santa Clara, CA (US); Chen Zheng, Santa Clara, CA (US); Xinyu Guo, Santa Clara, CA (US); Brandon Chui, Santa Clara, CA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 18/396,475

(22) Filed: Dec. 26, 2023

(65) Prior Publication Data

US 2025/0165560 A1 May 22, 2025

(30) Foreign Application Priority Data

Nov. 17, 2023 (CN) ......................... 202311602307.4

(51) Int. Cl.
*G06F 18/22* (2023.01)
(52) U.S. Cl.
CPC .................................. *G06F 18/22* (2023.01)
(58) Field of Classification Search
CPC ..... G01N 30/00; G01N 30/8651; G06F 18/22
See application file for complete search history.

(56) References Cited

U.S. PATENT DOCUMENTS

| | | | | |
|---|---|---|---|---|
| 2005/0258355 A1* | 11/2005 | Ogata | ................ | G01N 30/8675 250/281 |
| 2008/0238699 A1* | 10/2008 | Byrne | ................ | G05B 23/0281 340/632 |
| 2014/0260536 A1* | 9/2014 | Sadowski | .......... | G01N 30/8675 73/23.37 |
| 2014/0274751 A1 | 9/2014 | Sadowski et al. | | |
| 2016/0047782 A1* | 2/2016 | Sadowski | .......... | G01N 30/8686 73/23.4 |
| 2020/0232956 A1* | 7/2020 | Kuehl | ................. | H01J 49/0036 |

(Continued)

FOREIGN PATENT DOCUMENTS

| | | | | |
|---|---|---|---|---|
| CN | 108663437 A | * 10/2018 | ............. | G01N 30/00 |
| CN | 109 239 247 A | 1/2019 | | |

(Continued)

OTHER PUBLICATIONS

Stephen E. Stein et al., "Optimization and testing of mass spectral library search algorithms for compound identification", American Society for Mass Spectrometry, May 4, 1994, 8 pages.

(Continued)

*Primary Examiner* — William P Bartlett

(57) ABSTRACT

In some examples, an apparatus may include analyzing a sample, and analyzing at least one reference sample. A determination may be made as to whether the sample includes a library match score. Based on a determination that the sample includes the library match score, the library match score and a retention time may be analyzed to determine similarity between the sample and the at least one reference sample.

19 Claims, 14 Drawing Sheets

(56)                    References Cited

U.S. PATENT DOCUMENTS

2022/0115220 A1*   4/2022   Martin  .................... H01J 49/26
2024/0302337 A1*   9/2024   Wang  ................. G01N 30/8637

FOREIGN PATENT DOCUMENTS

WO          2015191980  A1     12/2015
WO          2023037293  A2      3/2023

OTHER PUBLICATIONS

Yuanyue Li et al., "Spectral entropy outperforms MS/MS dot product similarity for small-molecule compound identification", Nature Methods, vol. 18, Dec. 2021, 19 pages.
Extended European Search Report; EP Application No. 24213254.6-1001; EPO; Apr. 7, 2025; 7 pages.
Yuanyue, et al. "Spectral entropy outperforms MS/MS dot product similarity for small-molecule compound identification"; Nature Methods; vol. 18; Dec. 2021; pp. 1524-153.
Wan et al. "Comparing Similar Spectra: From Similarity Index to Spectral Contrast Angle"; J Am Soc Mass Spectrum 2002, 13, pp. 85-88.
Agilent MassHunter Optimizer for GC Triple Quad, 16 pages, www.agilent.com, First Edition, Jan. 2019.
TSQ Series—Auto SRM User Guide with Chromeleon 7.2 support 1R120587-0005—Revision C—Dec. 2015.
Yong et al.; "A novel approach to transforming a non-targeted metabolic profiling method to a pseudo-targeted method using the retention time locking gas chromatography/mass spectrometry-selected ions monitoring"; Journal of Chromatography A, 1255 (2012) pp. 228-236.

* cited by examiner

400 — Import the data from the icon

402 — If the spectral library method is used, set the spectral library matching score outlier(60%)

QQQ xxxx xxx (A)

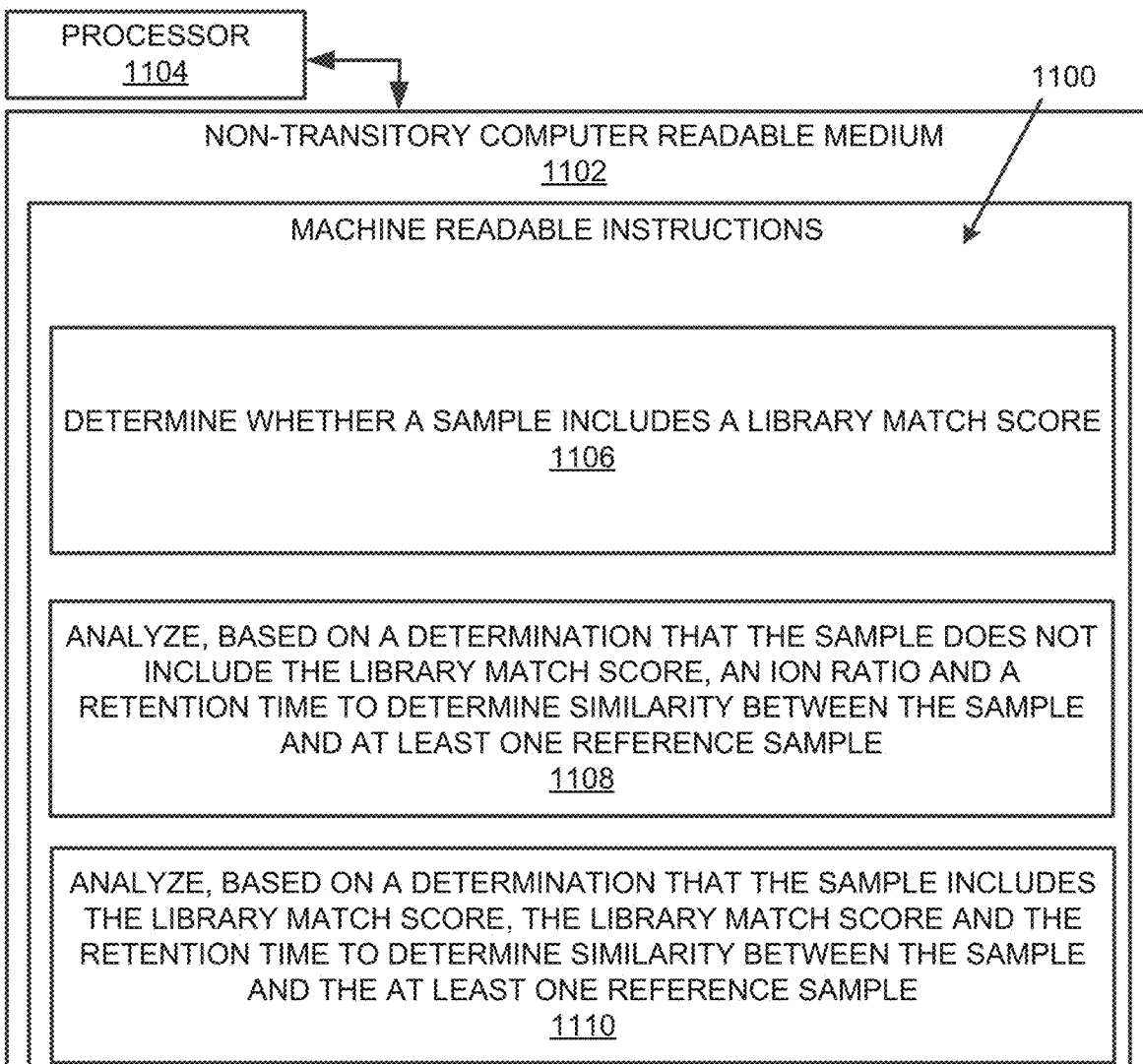

PROCESSOR
1104

1100

NON-TRANSITORY COMPUTER READABLE MEDIUM
1102

MACHINE READABLE INSTRUCTIONS

DETERMINE WHETHER A SAMPLE INCLUDES A LIBRARY MATCH SCORE
1106

ANALYZE, BASED ON A DETERMINATION THAT THE SAMPLE DOES NOT INCLUDE THE LIBRARY MATCH SCORE, AN ION RATIO AND A RETENTION TIME TO DETERMINE SIMILARITY BETWEEN THE SAMPLE AND AT LEAST ONE REFERENCE SAMPLE
1108

ANALYZE, BASED ON A DETERMINATION THAT THE SAMPLE INCLUDES THE LIBRARY MATCH SCORE, THE LIBRARY MATCH SCORE AND THE RETENTION TIME TO DETERMINE SIMILARITY BETWEEN THE SAMPLE AND THE AT LEAST ONE REFERENCE SAMPLE
1110

FIG. 11

FINGERPRINT SIMILARITY BASED SAMPLE ANALYSIS

PRIORITY

The present application claims priority under 35 U.S.C. 119(a)-(d) to Chinese Patent Application 202311602307.4, filed Nov. 17, 2023, which is incorporated by reference in its entirety.

BACKGROUND

With respect to fingerprint similarity for fingerprint chromatograms, similarity evaluation involves a comprehensive comparison of fingerprint chromatograms of a sample and reference samples to obtain similarity. In this regard, characteristic peaks may be simultaneously analyzed for assessing the stability and consistency of inter-batch product comparisons. Similarity evaluation may be utilized in various fields, such as, for example, medicine, environment, food quality, etc.

BRIEF DESCRIPTION OF DRAWINGS

Features of the present disclosure are illustrated by way of example and not limited in the following figure(s), in which like numerals indicate like elements, in which:

FIG. 11 illustrates a further example block diagram for fingerprint similarity based sample analysis in accordance with another example of the present disclosure.

DETAILED DESCRIPTION

Figure 1:
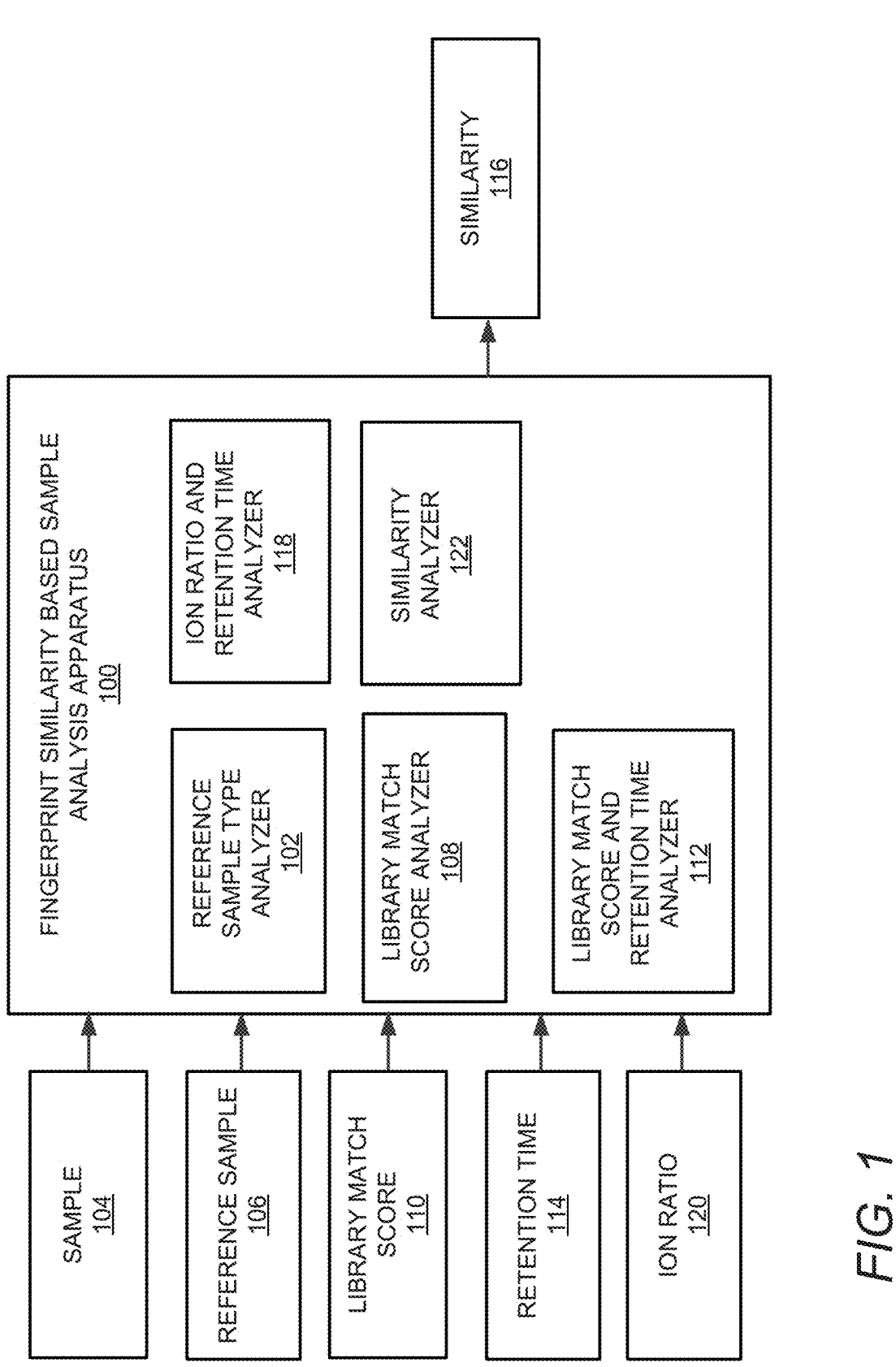
FIG. 1 illustrates a layout of a fingerprint similarity based sample analysis apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Fingerprint similarity based sample analysis apparatuses, methods for fingerprint similarity based sample analysis, and non-transitory computer readable media having stored thereon machine readable instructions to provide fingerprint similarity based sample analysis are disclosed herein. The apparatuses, methods, and non-transitory computer readable media disclosed herein provide for assessment of the similarity of mass spectral fingerprint spectra using multiple algorithms. The apparatuses, methods, and non-transitory computer readable media disclosed herein may be particularly relevant in the context of laboratory quality control and the analysis of impurities in synthetic substances, addressing the need for differential evaluation techniques.

With respect to fingerprint similarity for fingerprint chromatograms, as disclosed herein, similarity evaluation involves a comprehensive comparison of fingerprint chromatograms of a sample and reference samples to obtain similarity. In this regard, characteristic peaks may be simultaneously analyzed to assess the stability and consistency of inter-batch product comparisons. For example, one technique of similarity determination may include analyzing similarity between traditional medicine samples and reference chromatograms by using specific operational rules. However, for this technique, the similarity determination may be limited to supporting chromatographic data formats, and may not be suitable for similarity evaluation of complex samples due to its reliance on retention time as a matching criterion for shared characteristic peaks between samples.

Some techniques of similarity assessment are rooted in chromatographic spectroscopy and may not adequately address the evaluation of low-concentration components in samples. Additionally, individual variations, such as sampling, background noise, and response differences, may introduce biases when relying on a single reference sample for assessment. Furthermore, diverse application scenarios may require different evaluation approaches, making multiple algorithms more suitable for various samples. For example, complex samples often contain numerous compounds, and relying solely on chromatographic separation may not distinguish compounds with similar retention times, potentially leading to biased assessment results. Similarity assessment based on mass spectrometry data may use the spectral data as a further qualitative basis for assessing compounds between samples. However, achieving similarity assessment using mass spectrometer data may necessitate manual compound recognition, data export, manual alignment, and calculation, which can be time consuming, and rely significantly on the experience of analysts, leading to potentially inconsistent results among different individuals.

Figure 6:
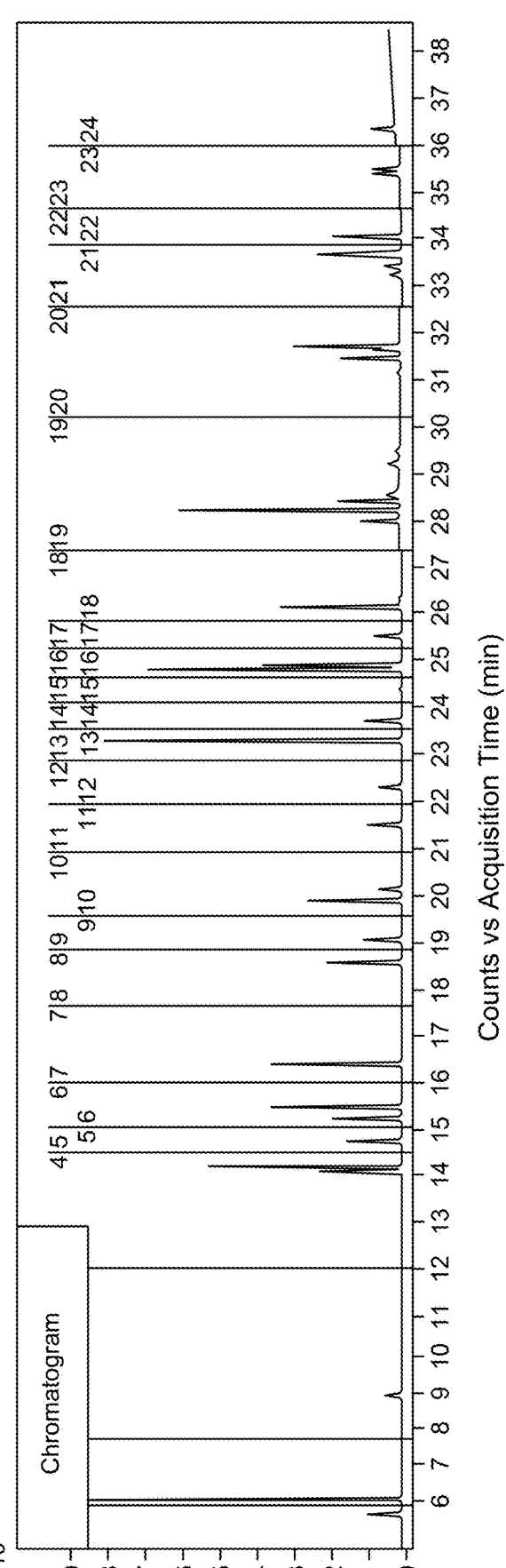
FIG. 6 illustrates a chromatogram and a mass spectrometry (MS) spectrum of a gas chromatography-mass spectrometry (GCMS) operating in full scan (SCAN) mode, in accordance with an example of the present disclosure.
Figure 6:
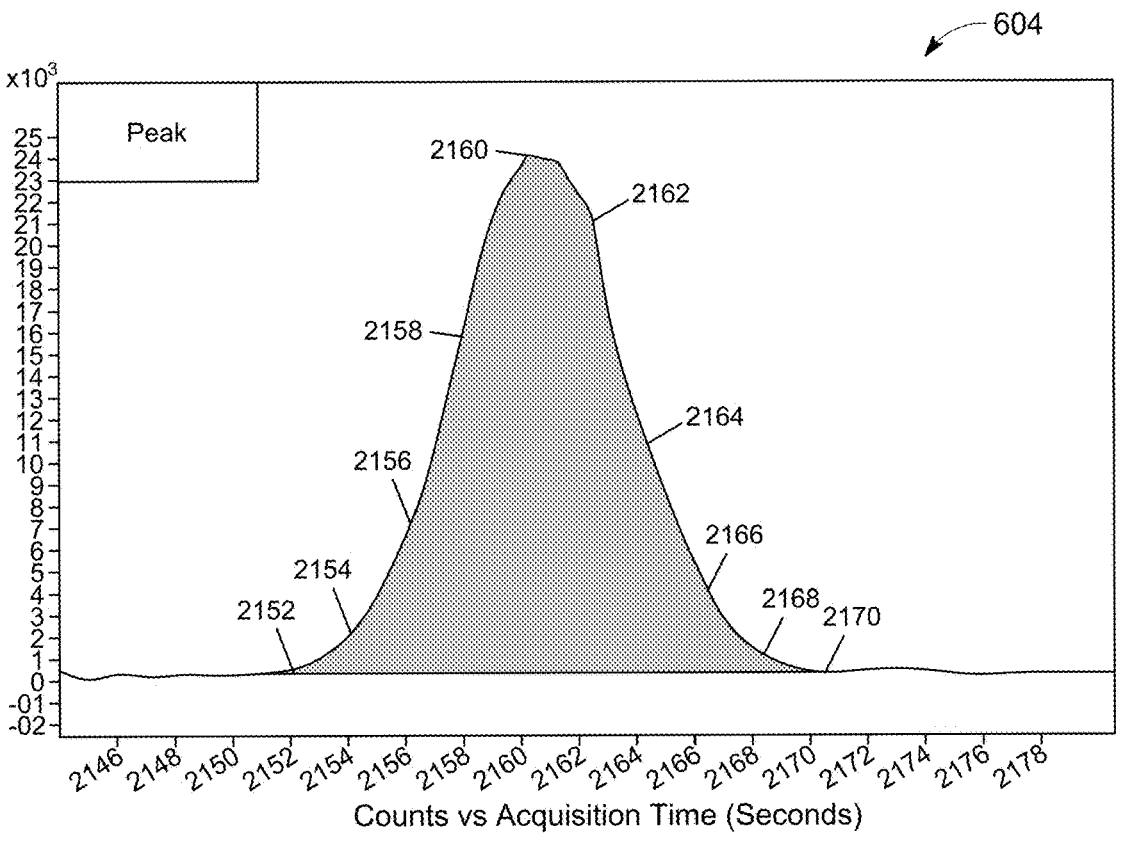
Figure 6:
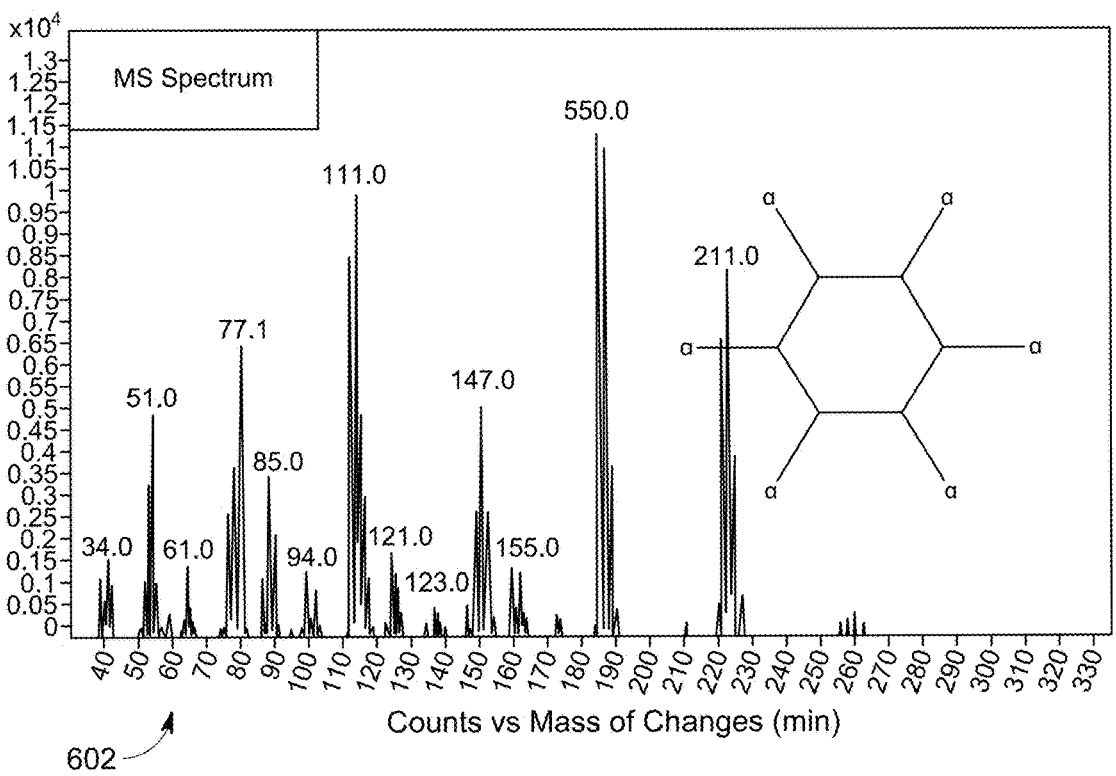

Currently, fingerprint similarity analysis supports data from gas chromatography-mass spectrometry (GCMS) instruments. GCMS may combine a gas chromatograph, which vaporizes a sample into a gas phase and separates it into various components, with a mass spectrometer, which breaks components into ionized fragments. This allows components to be analyzed separately for improved identification and quantification. In this regard, FIG. 6 illustrates a chromatogram 600 and a mass spectrometry (MS) spectrum 602 of a GCMS operating in full scan (SCAN) mode, in accordance with an example of the present disclosure. For example, FIG. 6 shows the chromatogram 600 of GCMS, where scanned data points are shown on the peak shape 604 of the chromatogram, one after another. The response value of each data point may be obtained by summing the responses of all ions in a full scan mass spectrum, so the chromatogram is also called TIC (total ion chromatogram).

In order to address at least the aforementioned drawbacks related, for example, to lack of mass spectrometry data evaluation methods, the need for manual verification of reference samples, manual calculations for multiple reference samples, and manual compound recognition and alignment, the apparatuses, methods, and non-transitory computer readable media disclosed herein provide a software solution for similarity assessment employing multiple algorithms. The apparatuses, methods, and non-transitory computer readable media disclosed herein automatically perform qualitative assessment of feature markers based on chromatographic retention times and mass spectrometry features. The apparatuses, methods, and non-transitory computer readable media disclosed herein comprehensively compare the fingerprint spectra of samples and reference samples to determine their similarity, facilitating the evaluation of sample similarity to one or more reference samples. Additionally, the apparatuses, methods, and non-transitory computer readable media disclosed herein perform the requisite checks and analyses of feature markers in samples and reference samples to ensure the stability and consistency of the similarity assessment process.

The apparatuses, methods, and non-transitory computer readable media disclosed herein provide for an automatic (e.g., without human intervention) and practical application and/or utilization of the similarity determination. For example, a user of the apparatuses, methods, and non-transitory computer readable media disclosed herein may specify a critical value for the similarity score (e.g., 80%). When samples with a similarity of more than 80% appear, a new selected ion monitoring (SIM) acquisition technique will be created automatically (e.g., to monitor the remaining feature markers only). Compared to the SCAN method (which has less selectivity and sensitivity), this new technique may be performed on a GCMS instrument to collect more targeted data to further confirm the evaluation results. For example, if there are 3 samples in a batch with a similarity greater than 80%, 3 new acquisition techniques may be automatically generated. Based on the different evaluation results of the respective samples, the new techniques established may be only for the characteristic compounds (e.g., feature markers) retained in the sample. That is, if some compounds in the sample fail the outlier evaluation during the similarity calculation process and are defined as having a response of 0, these compounds will not be included in the new acquisition technique.

The apparatuses, methods, and non-transitory computer readable media disclosed herein also provide for an automatic (e.g., without human intervention) and practical application and/or utilization of the similarity determination by automatic control of a device. For example, if it is determined that a sample is similar to a reference sample, the indication of similarity may be utilized to trigger an alert of the indicated similarity. Further, the triggering of the alert may result in shut down or otherwise modified operation of the device based on the indicated similarity, and/or the level of similarity.

Yet further, the apparatuses, methods, and non-transitory computer readable media disclosed herein encompass functionalities such as data import, automated extraction of inter-batch sample characteristic peaks, qualitative determination based on mass spectra for these peaks, average reference sample characteristic peak response, reference sample qualitative validation, similarity determination, generation of report templates, and help resources. In one example, the apparatuses, methods, and non-transitory computer readable media disclosed herein may be utilized for forensic identification of accelerant fingerprint chromatograms in arson investigations, and provide for extraction of inter-batch sample characteristic peak profiles.

For the apparatuses, methods, and non-transitory computer readable media disclosed herein, based on the full-scan mass spectrum, users may use a library search function to search for standard spectral libraries to identify compounds. In one example, if the qualitative result is BHC (benzene-hexachloride), if the BHC standard solution is used for analysis, it should have the same retention time and mass spectrum as the sample peak.

According to examples disclosed herein, for the apparatuses, methods, and non-transitory computer readable media disclosed herein, the similarity assessment workflow may support multiple algorithms and automatically perform qualitative determinations of feature markers based on chromatographic retention times and mass spectrometry features.

Operation of the apparatuses, methods, and non-transitory computer readable media disclosed herein may begin by analyzing reference sample data to automatically confirm the reliability of reference samples based on retention times and mass spectrometry features. Subsequently, the apparatuses, methods, and non-transitory computer readable media disclosed herein systematically evaluate feature markers in samples based on the same rules. When the mass spectrometry features of a feature marker in a sample match those in a reference sample at the same specific retention time, the peak area (e.g., response area) of that feature marker is retained, and otherwise, the peak area is automatically set to zero. The final similarity determination includes determining the arithmetic mean of the peak areas of all feature markers in the reference samples and the remaining feature markers in the sample when multiple reference samples are present.

According to examples disclosed herein, the apparatuses, methods, and non-transitory computer readable media disclosed herein may be utilized for GCMS data acquired using different acquisition modes, including full scan (SCAN), selected ion monitoring (SIM), or multiple reaction monitoring (MRM). In this regard, the apparatuses, methods, and non-transitory computer readable media disclosed herein perform automated (e.g., without human intervention) qualitative determination on user-specified characteristic peaks, and subsequently utilize the response of these peaks to assess similarity according to specific computational rules.

For the apparatuses, methods, and non-transitory computer readable media disclosed herein, when SCAN data is utilized, deconvolution algorithms may be utilized to extract the mass spectra of characteristic peaks. For example, when the sample data acquired in GCMS mode is SCAN data, a deconvolution algorithm may be utilized to extract the full scan mass spectrometry features of feature markers. The differences between the mass spectra of peaks with identical retention times in inter-batch samples may be compared with reference fingerprint chromatograms. In this regard, the feature markers in samples and reference samples may be compared, and their differences in mass spectrometry features may be assessed based on matching scores to perform qualitative determinations.

The apparatuses, methods, and non-transitory computer readable media disclosed herein also perform automated qualitative determination based on matching scores of these mass spectra. For example, with respect to two available qualitative techniques, one of the qualitative techniques may be automatically selected. This is because if a user sets a reference library, there will be a value in a "library match score" column as disclosed herein. The presence of a value may mean that a user has chosen to use retention time (RT) and a library match score as the qualitative basis. Alternatively, if there is no value in the library match score, this may mean that a user has chosen to use retention time and ion ratio as the qualitative basis. A user may also perform a similarity analysis, at which time qualitative judgments may be automatically performed on all compounds. Based on the rules disclosed herein, the response area of compounds with outliers in a sample may be defined as 0, and the final response area value may be used for analysis by utilizing an algorithm that is selected, with the final results being listed in a "Similarity %" column as disclosed herein.

For the apparatuses, methods, and non-transitory computer readable media disclosed herein, when SIM or MRM data is utilized, the degree of alignment between the qualitative ions and the quantitative ion ratios of the characteristic peaks may serve as the basis for automated qualitative determination. For example, when sample data is acquired in SIM or MRM mode or as SCAN data without specifying a reference library, the qualitative ions or ion pairs that match at the same retention time between samples and reference samples may serve as the basis for automatic qualitative determinations. This may mean that the same feature markers in samples and reference samples should exhibit the same ion ratios. When using SCAN mode, retention time and mass spectrum match score may be utilized as the two basis for qualitative analysis of compounds. With respect to SIM and MRM modes, since there is no full mass spectrum for comparison, a comparison may be performed through the ratio of ions (or ratio of ion transitions for MRM), since for a specific compound, its ion ratio is also consistent within a certain range. Thus, when using SIM or MRM mode, retention time and ion ratio may be the two basis for qualitative analysis of compounds.

In order to determine aspects such as the same retention time, the same ion ratio, or an acceptable match score, these aspects may be based on user settings (e.g., quantitative method) for outliers. For example, the default outlier setting for retention time may be specified as 10%, and a more commonly used unit may be minutes. For example, if the default outlier setting for retention time is set to 0.2 minutes, then compounds whose retention times differ by greater than 0.2 minutes may be considered to be a different compound. Similarly, if a compound in a fire debris sample has a library match score that is lower than an outlier value, this may be considered to be different from the compound in the reference sample.

For the apparatuses, methods, and non-transitory computer readable media disclosed herein, when SCAN data is utilized and a user does not specify the reference full-scan mass spectra for the characteristic peaks, the alignment between the qualitative ions and the quantitative ion ratios of the characteristic peaks may be utilized as a foundation for automated qualitative determination. In this regard, as disclosed herein, one of the two qualitative techniques may be automatically selected, since if a user sets a reference library, there will be a value in a "library match score" column as disclosed herein. The presence of a value may mean that a user has chosen to use retention time and a library match score as the qualitative basis. Alternatively, if there is no value in the library match score, this may mean that a user has chosen to use retention time and ion ratio as the qualitative basis.

Based on the utilization of MS data, for the apparatuses, methods, and non-transitory computer readable media disclosed herein, the evaluated results include increased accuracy and efficiency. In this regard, the apparatuses, methods, and non-transitory computer readable media disclosed herein may be utilized to confirm accelerant fingerprint profiles, for example, in forensic fire investigation cases within the realm of public safety. Additionally, the apparatuses, methods, and non-transitory computer readable media disclosed herein may be utilized in various sectors, such as, for example, flavor substance analysis, traditional medicine fingerprint profiles, environmental pollutant analysis, food quality control, pharmaceutical quality control, chemical product quality control, illegal additive detection, differential analysis, and traceability analysis, etc.

The apparatuses, methods, and non-transitory computer readable media disclosed herein provide for similarity evaluation for GCMS, which extends beyond the approach of chromatographic evaluations seen in pharmacopoeia methods. In this regard, similarity based on a chromatographic method may be based on whether the compounds in a sample and a reference sample are consistent based on retention time. Fingerprint similarity may automatically confirm the qualitative identification of compounds based on library match score or ion ratio other than retention time. In addition to assessing chromatographic similarity, the apparatuses, methods, and non-transitory computer readable media disclosed herein may utilize mass spectral features for automated qualitative determination of characteristic peaks. This may include eliminating interference peaks, and ensuring the reliability of similarity results by excluding peaks with identical retention times but differing mass spectral features.

With respect to automated qualitative determination from full-scan data, for the apparatuses, methods, and non-transitory computer readable media disclosed herein, utilization of deconvolution algorithms to extract mass spectra of characteristic peaks ensures the acquisition of feature-rich, interference-free spectra. This precision provides accurate automated qualitative results, ensuring the accuracy of interference peak removal and obtaining reliable similarity evaluation outcomes.

In one example, the apparatuses, methods, and non-transitory computer readable media disclosed herein provide for utilization of cosine similarity for gas chromatography-mass spectrometry spectral similarity. However, other techniques may be utilized for similarity determination. While algorithms may be analyzed based on the response area of compounds, some compounds in a sample that are determined to be inconsistent with those in the reference sample may be defined using an area of 0. The similarity analysis may be implemented by the apparatuses, methods, and non-transitory computer readable media disclosed herein in the field of instrumental analysis for evaluating similarity between mass spectra.

When multiple reference samples are available, the peak areas (e.g., response areas) of feature markers used for similarity analysis may be determined as the arithmetic mean of the peak areas from all reference samples, and the remaining feature markers in the sample after automatic qualitative determinations.

The feature markers may need to meet specific conditions to be considered as satisfying the criteria for qualification. First, a determination may be made as to whether a reference spectrum exists (indicated by the presence of feature markers from reference samples and matching scores with the reference library). If there is a matching score, the feature markers may be considered to meet the qualification criteria when each individual feature marker's matching score is greater than or equal to a specific value (user-defined), and the retention time deviation is less than or equal to a specific value (e.g., user-defined value). If there is no matching score in the library, the feature markers may be considered to meet the qualification criteria when the ion response ratio deviation is less than or equal to a specific value (user-defined), and the retention time deviation is less than or equal to a specific value (e.g., user-defined). If any of the retention time or mass spectrometry feature qualification criteria for an individual feature marker is not met, the workflow indicates that the reference sample does not meet the qualification criteria.

To clear interference peaks (e.g., setting peak areas to zero), a comprehensive determination may be based on the retention time and mass spectrometry features of feature markers. Specifically, if the retention time deviation is less than or equal to a specific value (user-defined) and the mass spectrometry features also meet the qualification criteria, the feature marker's peak area may be retained. If either the retention time or mass spectrometry feature criterion is not met, the peak area of the feature marker may be set to zero.

The similarity assessment determination based on the feature markers of samples and reference samples may utilize either the peak area or peak height of quantitative ions or ion pairs or the sum of peak areas or peak heights of multiple ions or ion pairs.

The similarity assessment may be performed using multiple algorithms, which can include entropy similarity, cosine similarity, Pearson correlation coefficient, Mahalanobis distance, K-L divergence, and others.

The apparatuses, methods, and non-transitory computer readable media disclosed herein thus provide a comprehensive multi-algorithm-based workflow for assessing the similarity of mass spectral fingerprint spectra. The apparatuses, methods, and non-transitory computer readable media disclosed herein address the challenges of existing techniques by automating the qualitative assessment of feature markers based on chromatographic retention times and mass spectrometry features, and employing various algorithms for similarity evaluation. This approach enhances the accuracy and efficiency of similarity assessment for samples and reference samples, providing valuable insights for laboratory quality control and impurity analysis in diverse applications.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example fingerprint similarity based sample analysis apparatus (hereinafter also referred to as "apparatus 100").

Referring to FIG. 1, the apparatus 100 may include a reference sample type analyzer 102 that is executed by at least one hardware processor (e.g., the hardware processor 902 of FIG. 9, and/or the hardware processor 1104 of FIG. 11) to analyze a sample 104, and analyze at least one reference sample 106.

A library match score analyzer 108 that is executed by at least one hardware processor (e.g., the hardware processor 902 of FIG. 9, and/or the hardware processor 1104 of FIG. 11) may determine whether the sample 104 includes a library match score 110.

A library match score and retention time analyzer 112 that is executed by at least one hardware processor (e.g., the hardware processor 902 of FIG. 9, and/or the hardware processor 1104 of FIG. 11) may analyze, based on a determination that the sample 104 includes the library match score 110, the library match score 110 and a retention time 114 to determine similarity 116 between the sample 104 and the at least one reference sample 106.

An ion ratio and retention time analyzer 118 that is executed by at least one hardware processor (e.g., the hardware processor 902 of FIG. 9, and/or the hardware processor 1104 of FIG. 11) may analyze, based on a determination that the sample 104 does not include the library match score 110, an ion ratio 120 and the retention time 114 to determine similarity 116 between the sample 104 and the at least one reference sample 106.

A similarity analyzer 122 that is executed by at least one hardware processor (e.g., the hardware processor 902 of FIG. 9, and/or the hardware processor 1104 of FIG. 11) may determine, based on cosine similarity, the similarity 116 between the sample 104 and the at least one reference sample 106. Alternatively or additionally, the similarity analyzer may determine, based on entropy similarity, the similarity 116 between the sample 104 and the at least one reference sample 106.

According to examples disclosed herein, the library match score and retention time analyzer 112 may analyze, based on the determination that the sample 104 includes the library match score 110, the library match score 110 and the retention time 114 to determine similarity 116 between the sample 104 and the at least one reference sample 106 by determining, for a single reference sample entry, a response area of a compound associated with the single reference sample entry. Alternatively, the library match score and retention time analyzer 112 may determine, for a plurality of reference sample entries, an average response area of a compound associated with the plurality of reference sample entries.

According to examples disclosed herein, the ion ratio and retention time analyzer 118 may analyze, based on the determination that the sample 104 does not include the library match score 110, the ion ratio 120 and the retention time 114 to determine similarity 116 between the sample 104 and the at least one reference sample 106 by determining, for a single reference sample entry, a response area of a compound associated with the single reference sample entry. Alternatively, the ion ratio and retention time analyzer 118 may determine, for a plurality of reference sample entries, an average response area of a compound associated with the plurality of reference sample entries.

Operation of the apparatus 100 is described in further detail with reference to FIGS. 1-8.

Figure 2:
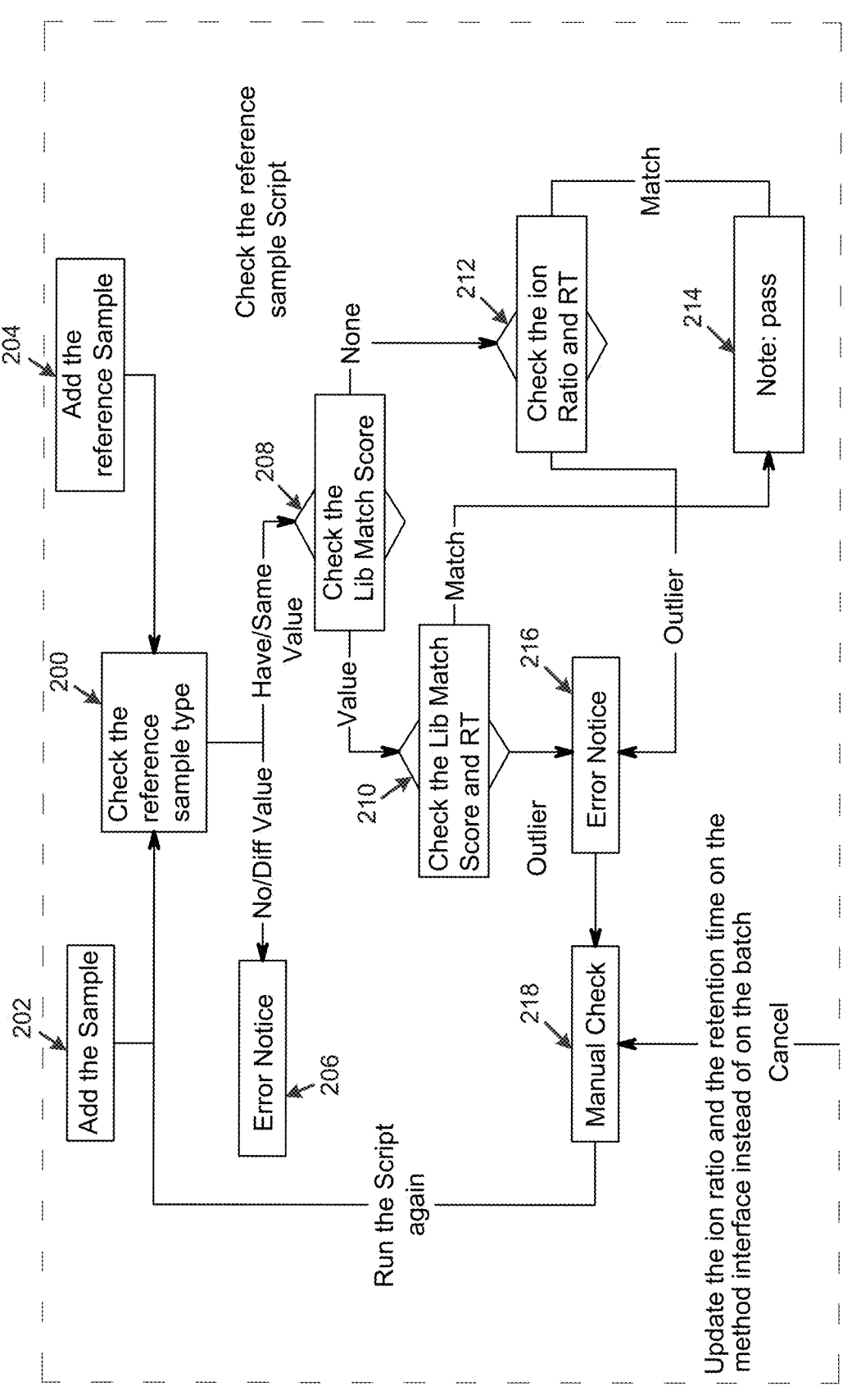
FIG. 2 illustrates a flow chart of checking of a reference sample script to illustrate operation of the fingerprint similarity based sample analysis apparatus of FIG. 1, in accordance with an example of the present disclosure.

FIG. 2 illustrates a flow chart of checking of a reference sample script to illustrate operation of the apparatus 100, in accordance with an example of the present disclosure.

Referring to FIG. 2, at block 200, the reference sample type analyzer 102 may analyze a reference sample type with respect to the sample 104 at 202 and the reference sample 106 at 204. For a user's gasoline residue analysis of fire debris samples as an example to demonstrate operation of the apparatus 100, examples of the sample 104 analyzed by a GCMS instrument include a fire debris sample, and examples of the reference sample 106 may include standard gasoline. There may be one reference sample, or multiple reference samples may be utilized, such as gasoline from different gas stations or gasoline with different octane numbers.

At block 200, based on a determination by the reference sample type analyzer 102 that the values (e.g., different standard names) are different, at block 206, the reference sample type analyzer 102 may generate an error notice. For example, a user may specify a reference sample in a "Standard Name" column (e.g., see FIG. 7) so that the reference sample type analyzer 102 knows which sample or samples are the reference sample. Since different types of samples may not be analyzed at the same time, if the user enters multiple different values, subsequent runs will generate an error notice. For example, while one or more "gasoline" types may be entered and analyzed, the samples may not have one "gasoline" and one "kerosene".

Alternatively, at block 200, based on a determination by the reference sample type analyzer 102 that the values are the same (e.g., a user has input a duplicate standard name), at block 208, the library match score analyzer 108 may determine the library match score 110. In this regard, the library match score analyzer 108 may determine whether the sample includes a library match score.

Based on a determination by the library match score analyzer 108 that there is a value (e.g., the user specifies a reference library in the quantitative method, the library match score of compounds will be displayed) for the library match score 110, at block 210, the library match score and retention time analyzer 112 may determine the library match score 110 and retention time 114. In this regard, the library match score and retention time analyzer 112 may analyze, based on a determination that the sample includes the library match score, the library match score and a retention time to determine similarity between the sample and the at least one reference sample.

Figure 7:
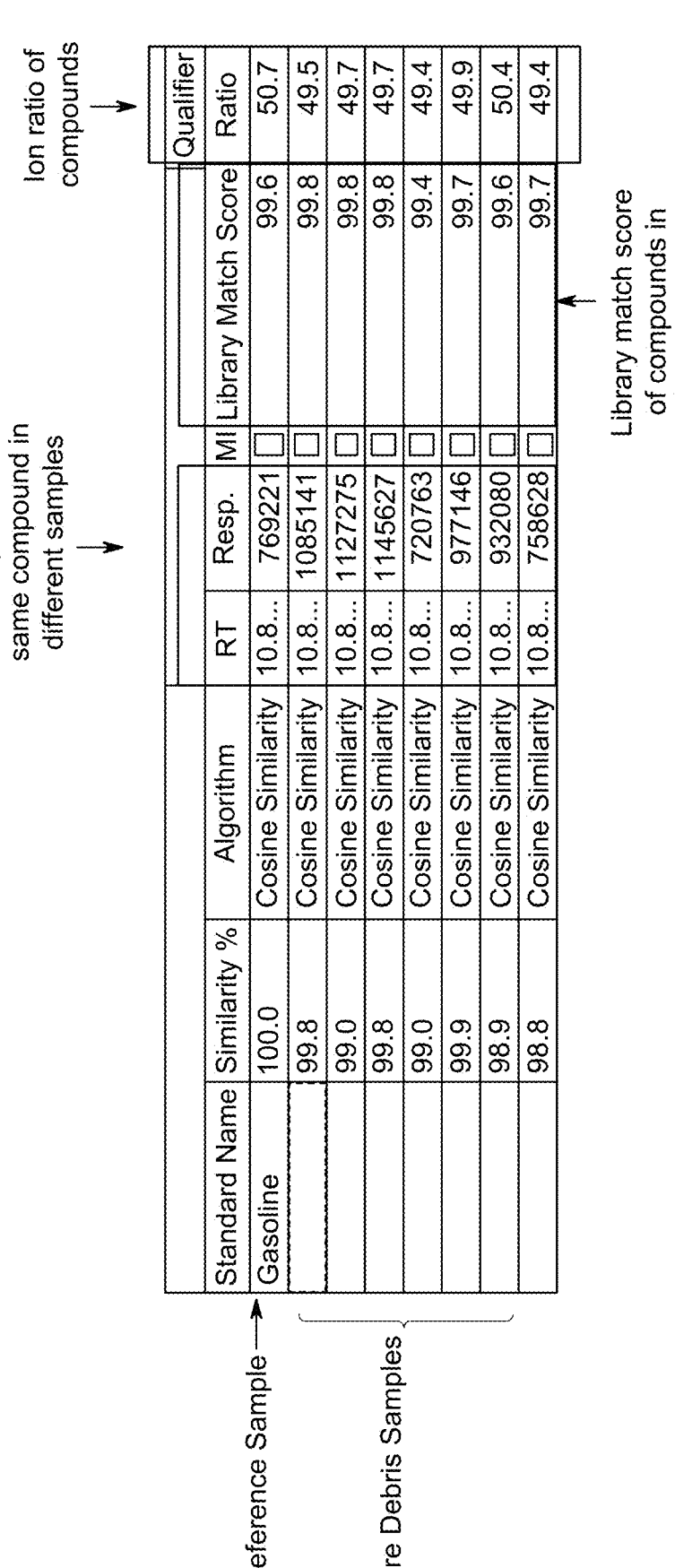
FIG. 7 illustrates a schematic diagram of a software interface of the fingerprint similarity based sample analysis apparatus of FIG. 1, in accordance with an example of the present disclosure.

Based on a determination by the library match score analyzer 108 that there is no value for the library match score 110, at block 212, the ion ratio and retention time analyzer 118 may determine the ion ratio 120 and the retention time 114. Thus, the ion ratio and retention time analyzer 118 may analyze, based on a determination that the sample does not include the library match score, the ion ratio and the retention time to determine similarity between the sample and the at least one reference sample. In this regard, one of the two qualitative techniques may be selected by the software, because if the user sets a reference library, there will be a value in the "Library Match Score" column in the software. The presence of a value may mean that the user has chosen to use retention time and library match score as the qualitative basis. On the contrary, if there is no value in the library match score, this means that the user has chosen to use retention time and ion ratio as the qualitative basis. Examples of an interface showing relevant parameters are shown in FIG. 7.

At block 212, based on a determination by the ion ratio and retention time analyzer 118 that there is a match (e.g., a match refers to the absence of any outliers), at block 214, the ion ratio and retention time analyzer 118 may generate an indication of a pass. In this regard, users may perform a check script whose purpose is to determine that all compounds in the reference sample do not have retention time outliers and library match score outliers (or do not have retention time outliers and ion ratio outliers). This is because if there are outliers even in the reference sample, this means that the reference sample itself has problems and is not suitable for comparison. A user may manually correct these problems, or may ignore them and proceed directly to the final similarity determination.

At block 212, based on a determination by the ion ratio and retention time analyzer 118 that there is an outlier, at block 216, the ion ratio and retention time analyzer 118 may generate an indication of an error notice (e.g., a reminder that users may need to check reference samples). For example, users may run a check script whose purpose is to determine that all compounds in the reference sample do not have retention time outliers and library match score outliers (or do not have retention time outliers and ion ratio outliers). This is because if there are outliers even in the reference sample, this means that the reference sample itself has problems and is not suitable for comparison. In this regard, a user may manually correct these problems, or may ignore them and proceed directly to the final similarity determination.

At block 218, a manual check may be implemented. In this regard, a user may choose to ignore the error notice.

Figure 3:
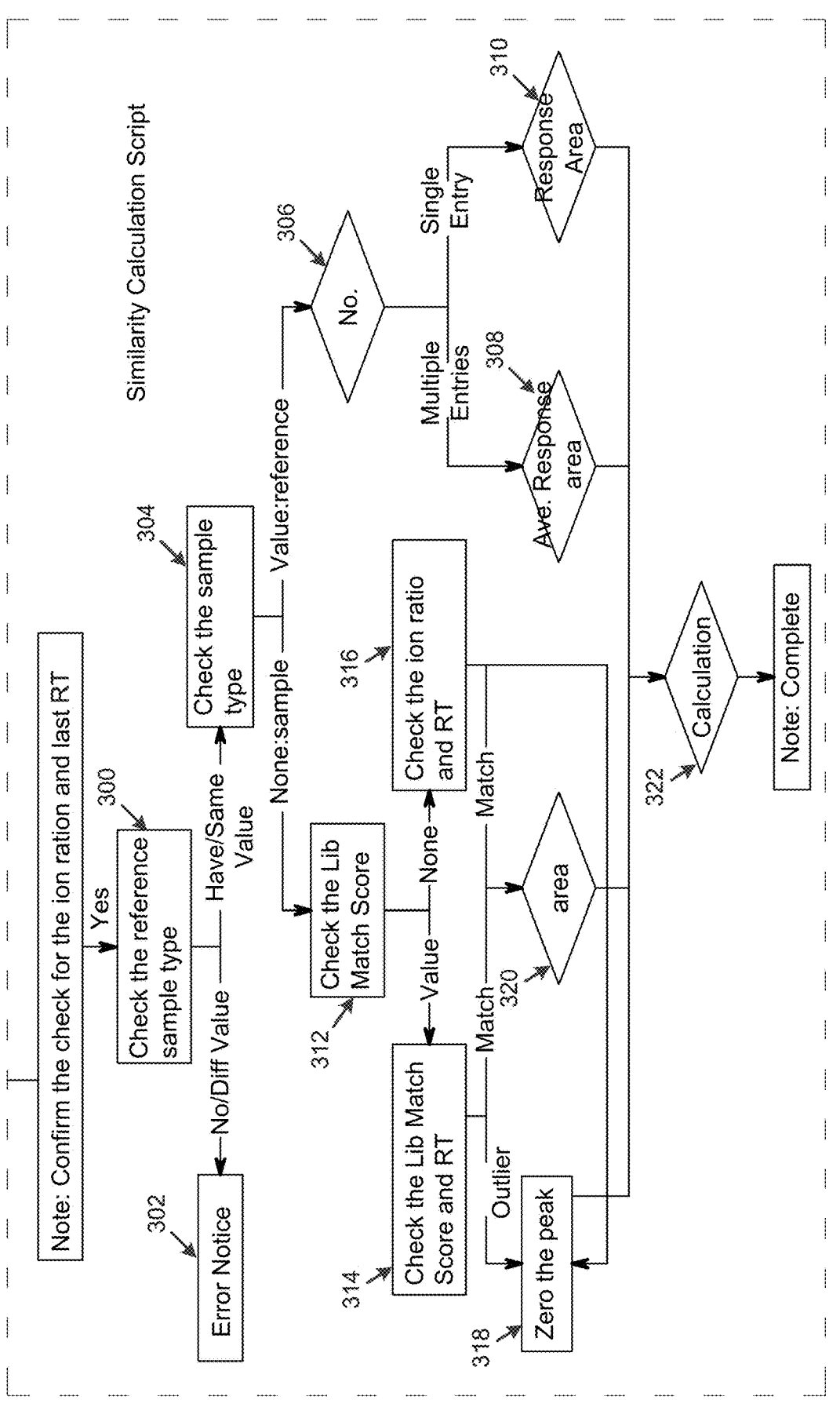
FIG. 3 illustrates a similarity determination script to illustrate operation of the fingerprint similarity based sample analysis apparatus of FIG. 1, in accordance with an example of the present disclosure.

FIG. 3 illustrates a similarity determination script to illustrate operation of the apparatus 100, in accordance with an example of the present disclosure. At the outset, a prompt may be displayed indicating "Confirm the check for the ion ratio and last RT". This prompt may request a user whether the reference sample has been checked.

Referring to FIG. 3, at block 300, the reference sample type analyzer 102 may determine the type of the reference sample 106. In this regard, a user may choose to run the analysis directly without checking the reference sample, in which case the reference sample type analyzer 102 may determine the type of the reference sample 106.

Based on a determination that there is no reference sample or that the reference sample has a different value, at block 302, the reference sample type analyzer 102 may generate an indication of an error notice. In this regard, if a user does not specify a reference sample, the reference sample type analyzer 102 does not determine which sample to use as the reference. Further, a user may need to specify the reference sample in the "Standard Name" column (e.g., see FIG. 7) so that the reference sample type analyzer 102 knows which sample or samples are the reference sample. Since the reference sample type analyzer 102 does not determine different types of samples at the same time, if a user enters multiple different values, subsequent runs will report an error notice. For example, one or more "gasoline" types may be entered, but not one "gasoline" and one "kerosene" may be entered.

Based on a determination that there is a reference sample or that the reference sample has a same value, at block 304, the reference sample type analyzer 102 may determine the sample type. For example, a user may input "gasoline" for multiple samples as reference sample.

Based on a determination by the reference sample type analyzer 102 at block 304 that the sample type is a reference sample, processing may proceed to block 306. Further, the average area may be determined at block 308 and the area may be determined at block 310. For example, if a user inputs multiple identical words in the "Standard Name" column (e.g., see FIG. 7), the reference sample type analyzer 102 may consider the average response area of the same compound across these reference samples to be the response area that is used in the similarity analysis. The average response area at 308 may be determined based on multiple identical values at or the response area may be determined at 310 based on a single entry.

Based on a determination by the reference sample type analyzer 102 at block 304 that the sample type is a sample (e.g., column "standard name" specified by a user), processing may proceed to block 312. At block 312, the library match score analyzer 108 may determine the library match score 110. The library match score analyzer 108 may determine whether the sample includes a library match score. In this regard, the library match score analyzer 108 may automatically select two qualitative techniques. This is because if the user sets a reference library, there will be a value in the "Library Match Score" column of FIG. 7. The presence of a value may indicate that the user has chosen to use retention time and library match score as the qualitative basis. On the contrary, if there is no value in the "library match score", this indicates that the user has chosen to use retention time and ion ratio as the qualitative basis.

Based on a determination by the library match score analyzer 108 that there is a value for the library match score, at block 314 (similar to block 210), the library match score and retention time analyzer 112 may determine the library match score 110 and retention time 114.

Based on a determination by the library match score analyzer 108 that there is no value for the library match score, at block 316 (similar to block 212), the ion ratio and retention time analyzer 118 may determine the ion ratio 120 and retention time 114.

At block 316, based on a determination by the ion ratio and retention time analyzer 118 that there is no match, at block 318, the ion ratio and retention time analyzer 118 may zero the peak as disclosed herein. In this regard, the ion ratio and retention time analyzer 118 may confirm the compounds in the sample one by one, and process the response of the compound according to whether it meets (match) the outlier requirements. If the retention time and ion ratio of a compound in the sample is a "match" (within the set outlier value) the response of this compound will be retained. On the contrary, if any of the retention time or ion ratio of a compound is "not a match" (e.g., exceeds the set outlier value range), the response of this compound will be set to 0.

At block 320, the a response area may be determined as disclosed herein.

At block 322, the response area that has been qualitatively determined may be input into the algorithm selected by the user for analysis, and the similarity % result may be output.

Figure 4:
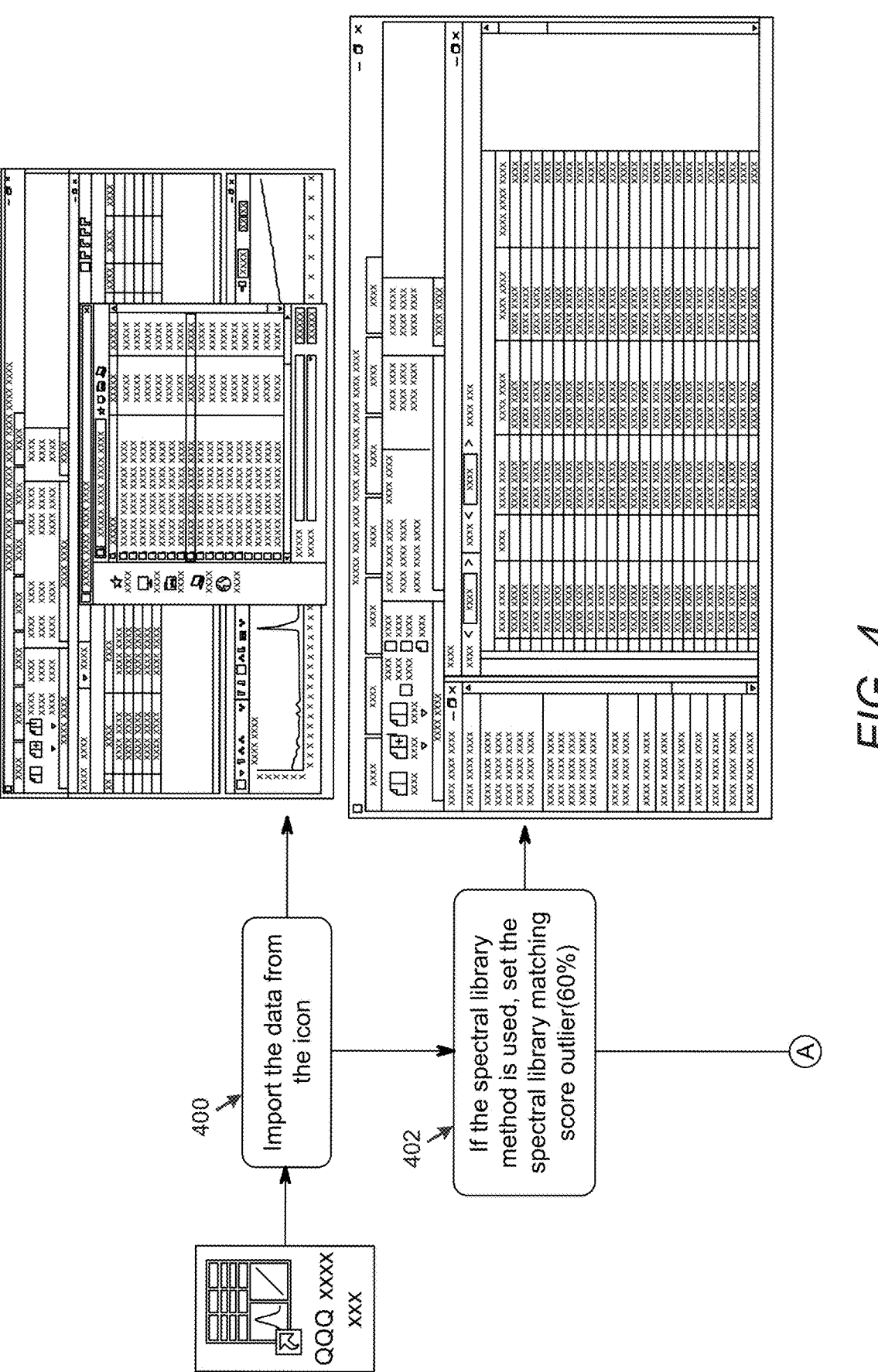
FIG. 4 illustrates a flow chart of application of fingerprint similarity based sample analysis to a batch of data to illustrate operation of the fingerprint similarity based sample analysis apparatus of FIG. 1, in accordance with an example of the present disclosure.
Figure 4:
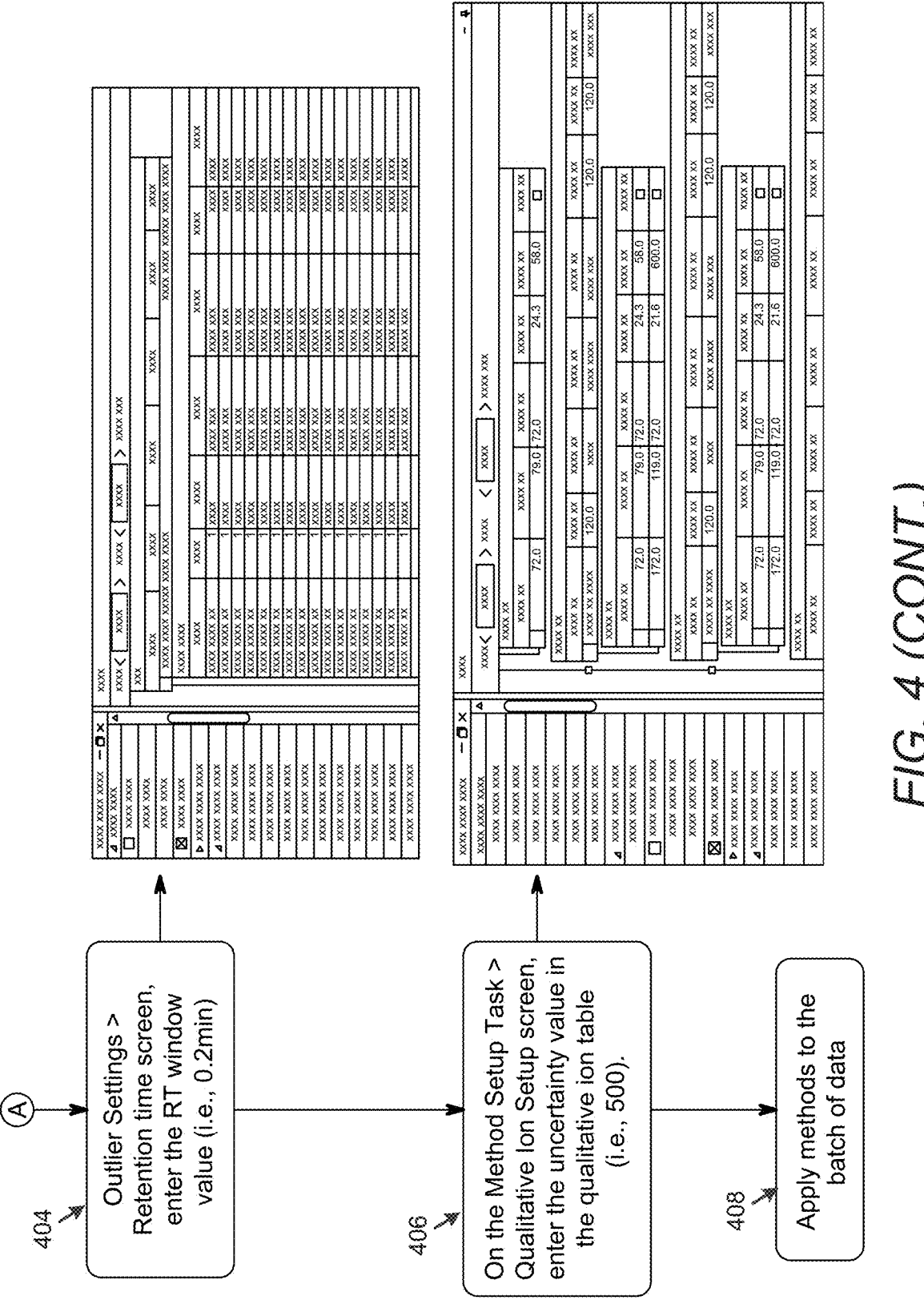

FIG. 4 illustrates a flow chart of application of fingerprint similarity based sample analysis to a batch of data to illustrate operation of the apparatus 100, in accordance with an example of the present disclosure.

Referring to FIG. 4, at block 400, data may be imported from an icon (e.g., the "add samples" button in MassHunter software).

At block 402, if the spectral library technique is utilized, the spectral library matching score outlier may be set to a specified value (e.g., 60%). In this regard, in order to determine whether it is the same retention time, the same ion ratio, or an acceptable match score, these aspects may be based on user settings (e.g., quantitative method) for outliers. For example, a default outlier setting for retention time is 10%, and a more commonly used unit is minutes. For example, if the outlier setting is set to 0.2 minutes, then compounds whose retention times differ by greater than 0.2 minutes will be considered to be different compound. In the same way, if a compound in a fire debris sample has a library match score lower than the outlier value, it is considered to be different from the compound in the reference sample.

At block 404, with respect to outlier settings, for the retention time screen, the retention time window value (e.g., 0.2 min), also referred to as retention time outlier, may be entered.

At block 406, with respect to method setup task, for the qualitative ion setup screen, the uncertainly value (e.g., 500) may be entered in the qualitative ion table. This uncertainty value may act as an outlier for qualifiers. For example, if the uncertainty value is 20%, for ions with an ion ratio equal to 100, the range of 80-120 may be specified to be normal.

At block 408, the quantitative methods may be applied to the batch of data. In this regard, after the GCMS instrument collects data, all data analysis work may be completed in the quantitative software (e.g., MassHunter Quantitative Analysis Software). The computations performed by MassHunter may require a user to specify a quantitative method. This quantitative method may need to include the name of the compound to be analyzed and the quantitative ion (or ion transition for MRM) used for quantification, and the retention time of the compound. A variety of techniques may be used to create quantitative methods, such as software automatically finding compounds, users manually creating them, etc.

Figure 5:
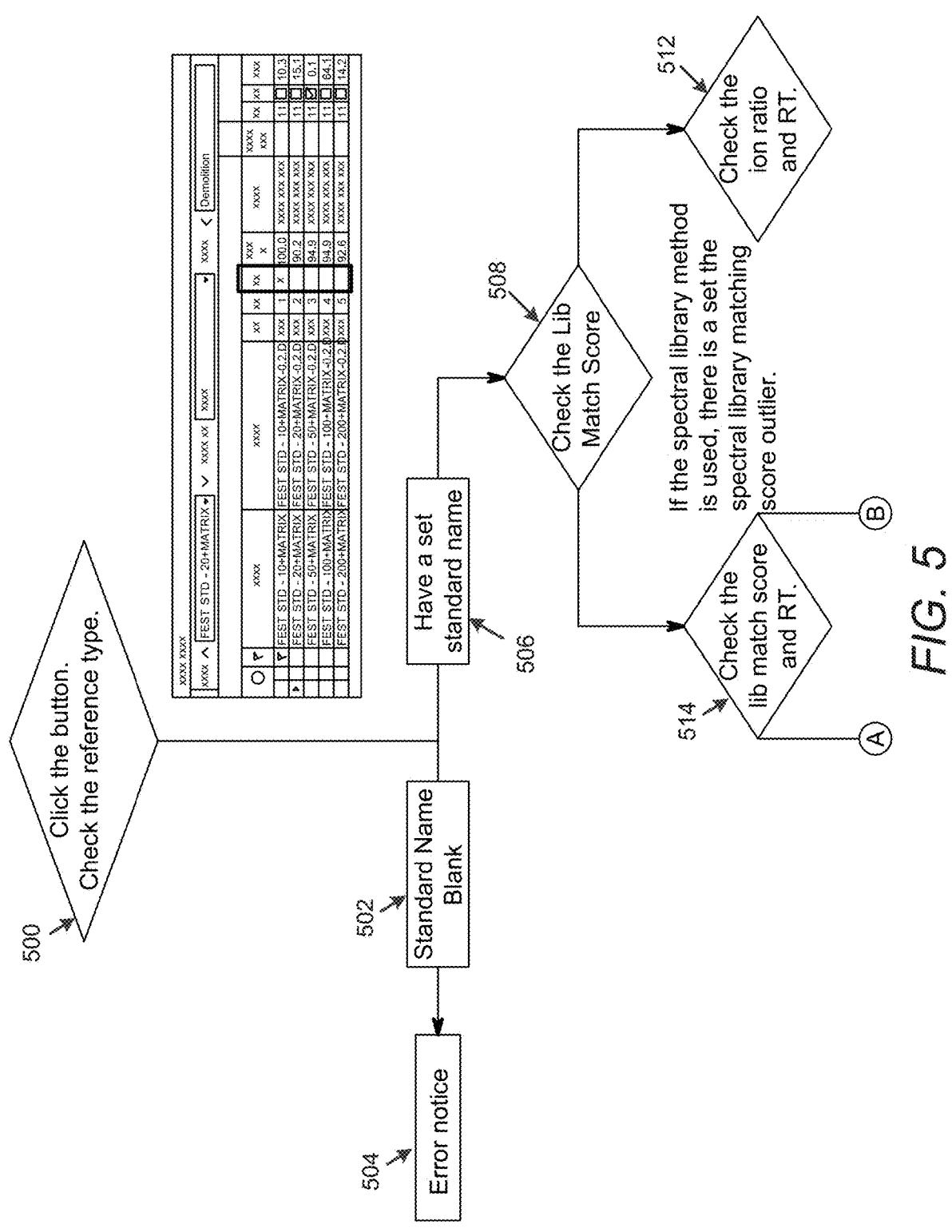
FIG. 5 illustrates a flow chart of a reference type analysis to illustrate operation of the fingerprint similarity based sample analysis apparatus of FIG. 1, in accordance with an example of the present disclosure.
Figure 5:
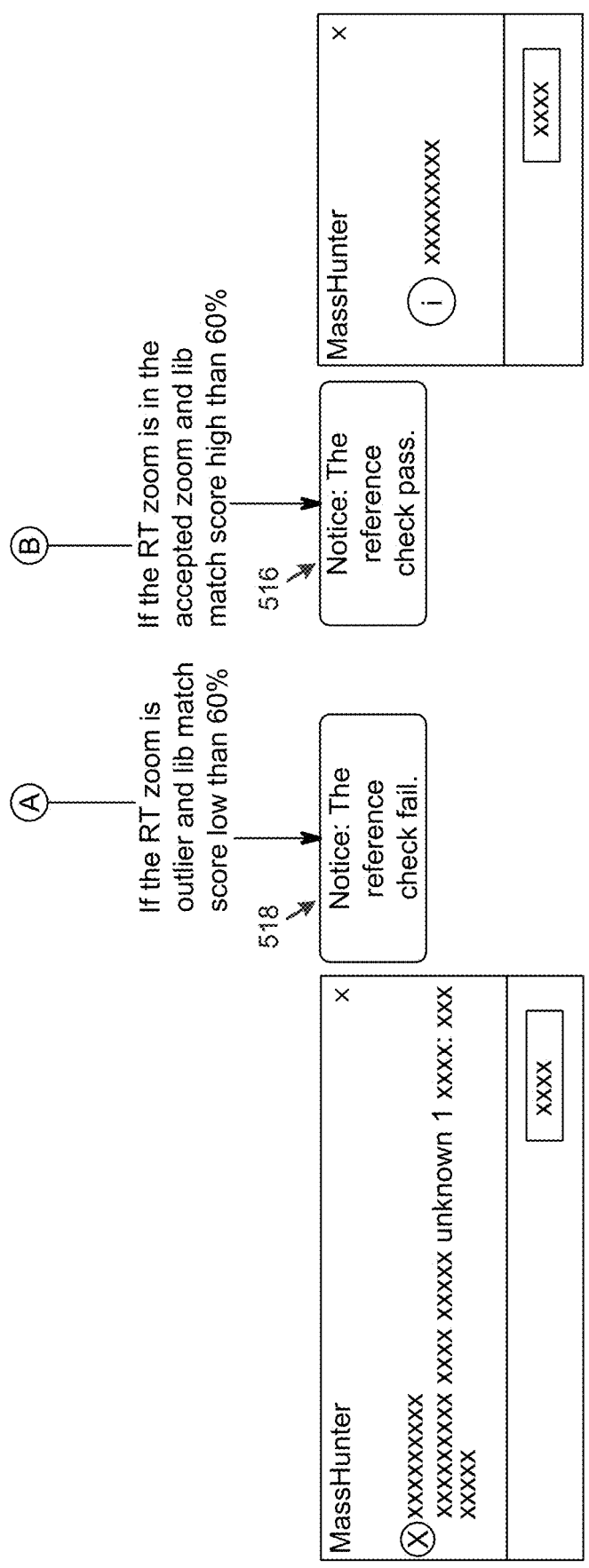

FIG. 5 illustrates a flow chart of a reference type analysis to illustrate operation of the apparatus 100, in accordance with an example of the present disclosure.

Referring to FIG. 5, at block 500, the reference sample type analyzer 102 may determine the reference sample type (e.g., as disclosed herein with reference to FIG. 2).

At block 502, based on a determination that the reference sample type is a standard name blank, an error notice may be generated at block 504. In this regard, as disclosed herein, a user may need to specify a reference sample in a "Standard Name" column (e.g., see FIG. 7) so that the reference sample type analyzer 102 knows which sample or samples are the reference sample. Since different types of samples may not be analyzed at the same time, if the user enters multiple different values, subsequent runs will generate an error notice. For example, while one or more "gasoline" types may be entered and analyzed, the samples may not have one "gasoline" and one "kerosene".

At block 506, based on a determination that the reference sample type is a standard name as disclosed herein, at block 508, the library match score analyzer 108 may determine the library match score 110.

Based on a determination by the library match score analyzer 108 that there is no value for the library match score, at block 512 (similar to block 212), the ion ratio and retention time analyzer 118 may determine the ion ratio 120 and the retention time 114.

Based on a determination by the library match score analyzer 108 that there is a value for the library match score, at block 514 (similar to block 210), the library match score and retention type analyzer 112 may determine the library match score 110 and retention time 114.

At block 512, based on a determination by the ion ratio and retention time analyzer 118 that there is a match, at block 516, the ion ratio and retention time analyzer 118 may generate an indication of a pass (e.g., no outlier of retention time and library match score as disclosed herein with respect to blocks 210 to 214).

At block 514, based on a determination by the ion ratio and retention time analyzer 118 that there is an outlier, at block 518, an indication of an error notice (e.g., fail) (e.g., as disclosed herein with respect to blocks 210 to 216) may be generated.

As disclosed herein, FIG. 6 illustrates a chromatogram and a MS spectrum of a GCMS operating in SCAN mode, in accordance with an example of the present disclosure.

Referring to FIG. 6, FIG. 6 shows a chromatogram of GCMS, with the peak shape of the chromatogram including scanned data points. The response value of each data point may be obtained by summing the responses of all ions in a full scan mass spectrum, so the chromatogram is also denoted TIC (total ion chromatogram).

Based on the full-scan mass spectrum, a user may use the library search function to search for standard spectral libraries to identify compounds. In one example, if the qualitative result is BHC (benzenehexachloride), if the BHC standard solution is used for analysis, it should have the same retention time and mass spectrum as the sample peak.

With respect to SIM and MRM modes, since there is no full mass spectrum for comparison, a comparison may be performed through the ratio of ions (or ratio of ion transitions for MRM), since for a specific compound, its ion ratio is also consistent within a certain range. Thus, when using SIM or MRM mode, retention time and ion ratio may be the two basis for qualitative analysis of compounds.

For a user's gasoline residue analysis of fire debris samples, a user's goal may include determining whether there is gasoline in a fire debris sample, and thus infer whether arson is involved. In this regard, examples of a sample analyzed by a GCMS instrument may include a fire debris sample, and examples of the reference sample may include standard gasoline. There may be one reference sample, or multiple reference samples may be utilized, such as gasoline from different gas stations or gasoline with different octane numbers.

After the GCMS instrument collects data, all data analysis work may be completed in a quantitative software such as MassHunter Quantitative Analysis Software. The operation performed by MassHunter may require a customer to specify a quantitative method. This quantitative method may need to include the name of the compound to be analyzed and the quantitative ion (or ion transition for MRM) used for quantification, and the retention time of the compound.

The MassHunter software may utilize an integrator to integrate the chromatographic peak of a specific quantitative ion at a specific retention time and obtain the peak area. In this regard, in to order to qualitatively determine whether the chromatographic peaks with the same retention time in different samples are the same compound, if a chromatographic peak has the same retention time in a fire debris sample and a gasoline reference, two ways may be used to determine whether they are the same compound. First, if the data is collected in SCAN mode and a user specifies a reference mass spectrum library in the quantitative method (this reference library may be directly generated from the reference sample, but may need to be manually specified in the quantitative method), qualitative confirmation may be based on the library match score of the compound between the fire debris sample and the reference sample at the same RT. Secondly, if the data is collected in SIM or MRM mode, or users do not specify a reference library, qualitative confirmation may be based on the ion ratio of the compound between the fire debris sample and the reference sample at the same RT.

In order to determine whether it is the same retention time, the same ion ratio, or an acceptable match score, these aspects may be based on user settings (e.g., quantitative method) for outliers. For example, a default outlier setting for retention time is 10%, and a more commonly used unit is minutes. For example, if the outlier setting is set to 0.2 minutes, then compounds whose retention times differ by greater than 0.2 minutes will be considered to be different compound. In the same way, if a compound in a fire debris sample has a library match score lower than the outlier value, it is considered to be different from the compound in the reference sample.

With respect to two available qualitative techniques, one of the qualitative techniques may be automatically selected. This is because if a user sets a reference library, there will be a value in a "library match score" column as disclosed herein. The presence of a value may mean that a user has chosen to use retention time and a library match score as the qualitative basis. Alternatively, if there is no value in the library match score, this may mean that a user has chosen to use retention time and ion ratio as the qualitative basis.

A user may import the collected data into data analysis software and set up a quantitative method (e.g., including a list of compounds to be compared, such as compound names, retention times, quantitative and qualitative ions), where the retention time outlier software has default values.

FIG. 7 illustrates a schematic diagram of a software interface of the apparatus 100, in accordance with an example of the present disclosure.

Referring to FIG. 7, a user may specify a reference sample in a "Standard Name" column (e.g., see FIG. 7) so that the reference sample type analyzer 102 knows which sample or samples are the reference sample. Since different types of samples may not be analyzed at the same time, if the user enters multiple different values, subsequent runs will generate an error notice. For example, while one or more "gasoline" types may be entered and analyzed, the samples may not have one "gasoline" and one "kerosene".

A check script may be executed to determine that all compounds in the reference sample do not have retention time outliers and library match score outliers (or do not have retention time outliers and ion ratio outliers). If outliers are present in the reference sample, the reference sample itself may have problems and may not be suitable for comparison. Users may manually correct these problems, or may ignore them and proceed directly to the final similarity analysis.

A user may also perform a similarity analysis, at which time qualitative judgments may be automatically performed on all compounds. Based on the rules disclosed herein, the response area of compounds with outliers in a sample may be defined as 0, and the final response area value may be used for analysis by utilizing an algorithm that is selected, with the final results being listed in a "Similarity %" column as disclosed herein.

With respect to similarity analysis between a sample and a reference sample, examples of techniques utilized herein may utilize the compound response area after automatic processing (e.g., performed qualitative judgments).

A first example of a technique utilized herein for similarity analysis is specified as follows:

$$\text{Dot Product or Cosine Similarity} = \frac{\left(\sum A_i A_S\right)^2}{\sum A_i^2 \sum A_S^2} = \frac{\sum A_i A_S}{\sqrt{\sum A_i^2} \sqrt{\sum A_S^2}}$$

For each compound in the quantitative method, $A_i$ is the response area in the sample, where $A_s$ is the response area in reference sample. The Dot product, or cosine similarity may represent an algebraic operation with vectors. In some cases, an algorithm may be utilized to treat MS spectra as vectors and determine a library match score between sample compound and standard library.

A second example of a technique utilized herein for similarity analysis is specified as follows:

$$I_i = \frac{\text{response area of compound } i}{\text{Sum of all area}},$$

$I_i$ is the normalized intensity of compound i;

$$S = -\sum_i I_i \ln I_i$$

$$S_{AB} = -\sum_i \left(\frac{I_{Ai} + I_{Bi}}{2}\right) \ln\left(\frac{I_{Ai} + I_{Bi}}{2}\right)$$

$$\text{Entropy Similarity} = 1 - \frac{2 \times S_{AB} - S_A - S_B}{\ln 4}$$

For Entropy similarity, $S_A$ and $S_B$ are the entropy of sample and reference sample.

Figure 8:
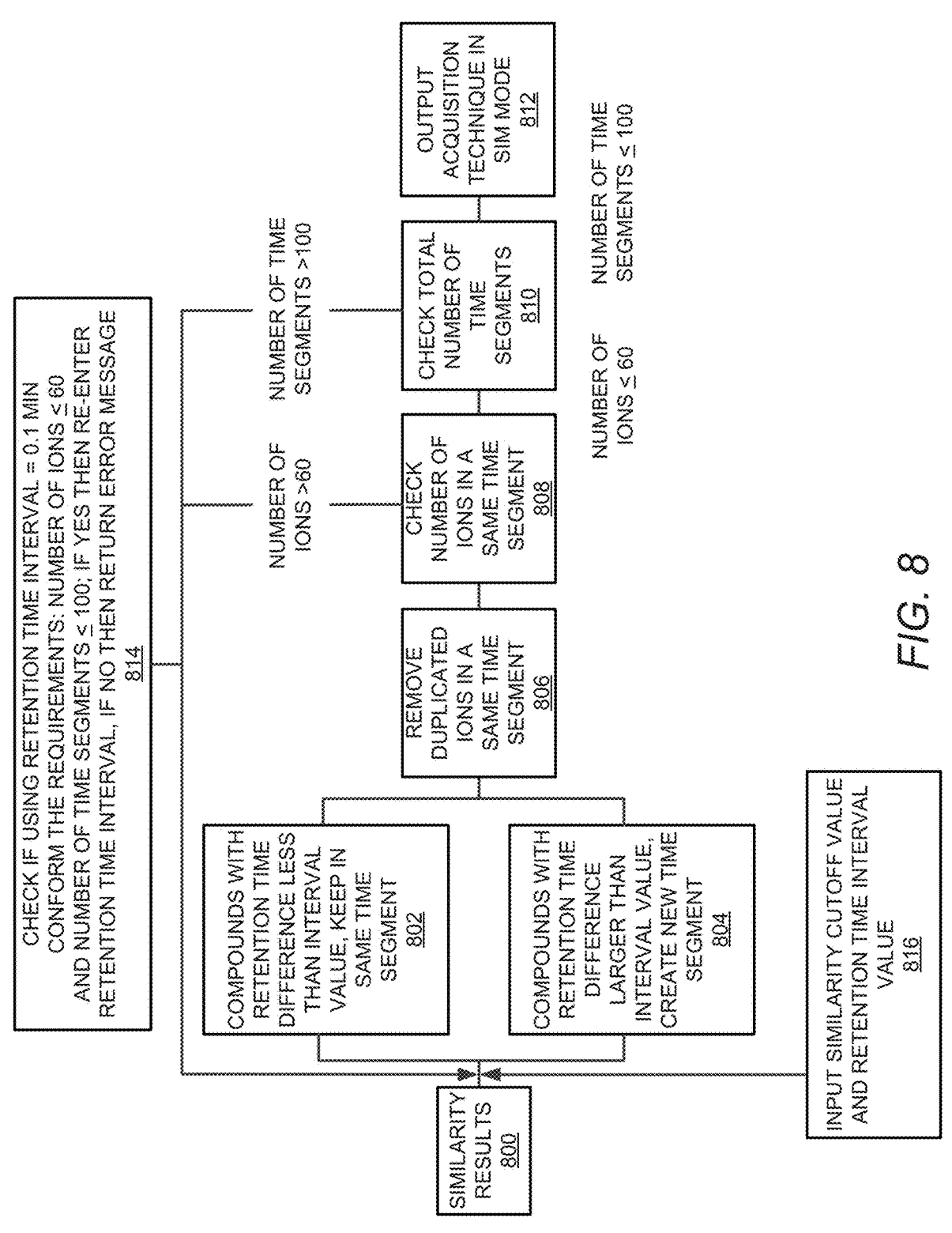
FIG. 8 illustrates a flowchart to illustrate an example of a practical implementation of the fingerprint similarity based sample analysis apparatus of FIG. 1, in accordance with an example of the present disclosure.

FIG. 8 illustrates a flowchart to illustrate an example of a practical implementation of the apparatus 100, in accordance with an example of the present disclosure.

Referring to FIG. 8, the similarity results (e.g., the similarity 116) at 800 may be analyzed at 802, where compounds with a retention time difference that is less than an interval value may be kept in the same time segment.

The similarity results (e.g., the similarity 116) at 800 may be analyzed at 804 where a new time segment may be created for compounds with a retention time difference that is larger than an interval value.

At 806, duplicated ions may be removed from the same time segment.

At 808, the number of ions in a same time segment may be determined.

At 810, the total number of time segments may be determined.

At 812 the acquisition technique may be output in SIM mode. In this regard, as disclosed herein, a user may specify a critical value for the similarity score (e.g., 80%). When samples with a similarity of more than 80% appear, a new SIM acquisition technique will be created automatically (e.g., to monitor the remaining feature markers only). This new technique may be performed on a GCMS instrument to collect more targeted data to further confirm the evaluation results. For example, if there are 3 samples in a batch with a similarity greater than 80%, 3 new acquisition techniques may be automatically generated. Based on the different evaluation results of the respective samples, the new techniques established may be only for the characteristic compounds (e.g., feature markers) retained in the sample. That is, if some compounds in the sample fail the outlier evaluation during the similarity calculation process and are defined as having a response of 0, these compounds will not be included in the new acquisition technique.

At 814, if the number of ions is greater than an associated value (e.g., 60) or the number of time segments is greater than an associated value (e.g., 100), a determination may be made as to whether using retention time interval=0.1 min conform the requirements: number of ions <60 and number of time segments <100; if yes, then re-enter retention time interval, if no then return error message.

At 816, the similarity cutoff value and retention time interval value may be input.

Figure 9:
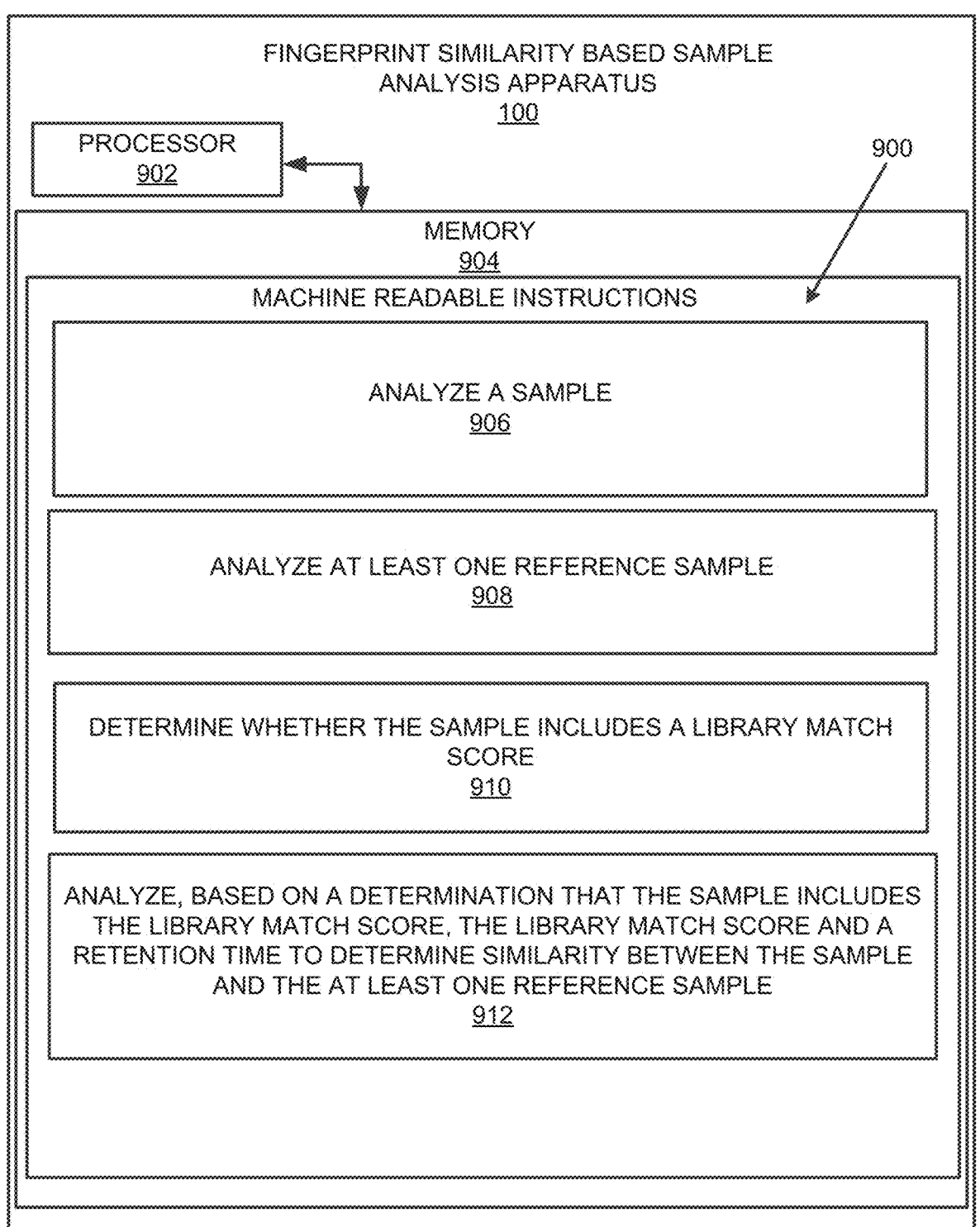
FIG. 9 illustrates an example block diagram for fingerprint similarity based sample analysis in accordance with an example of the present disclosure.
Figure 10:
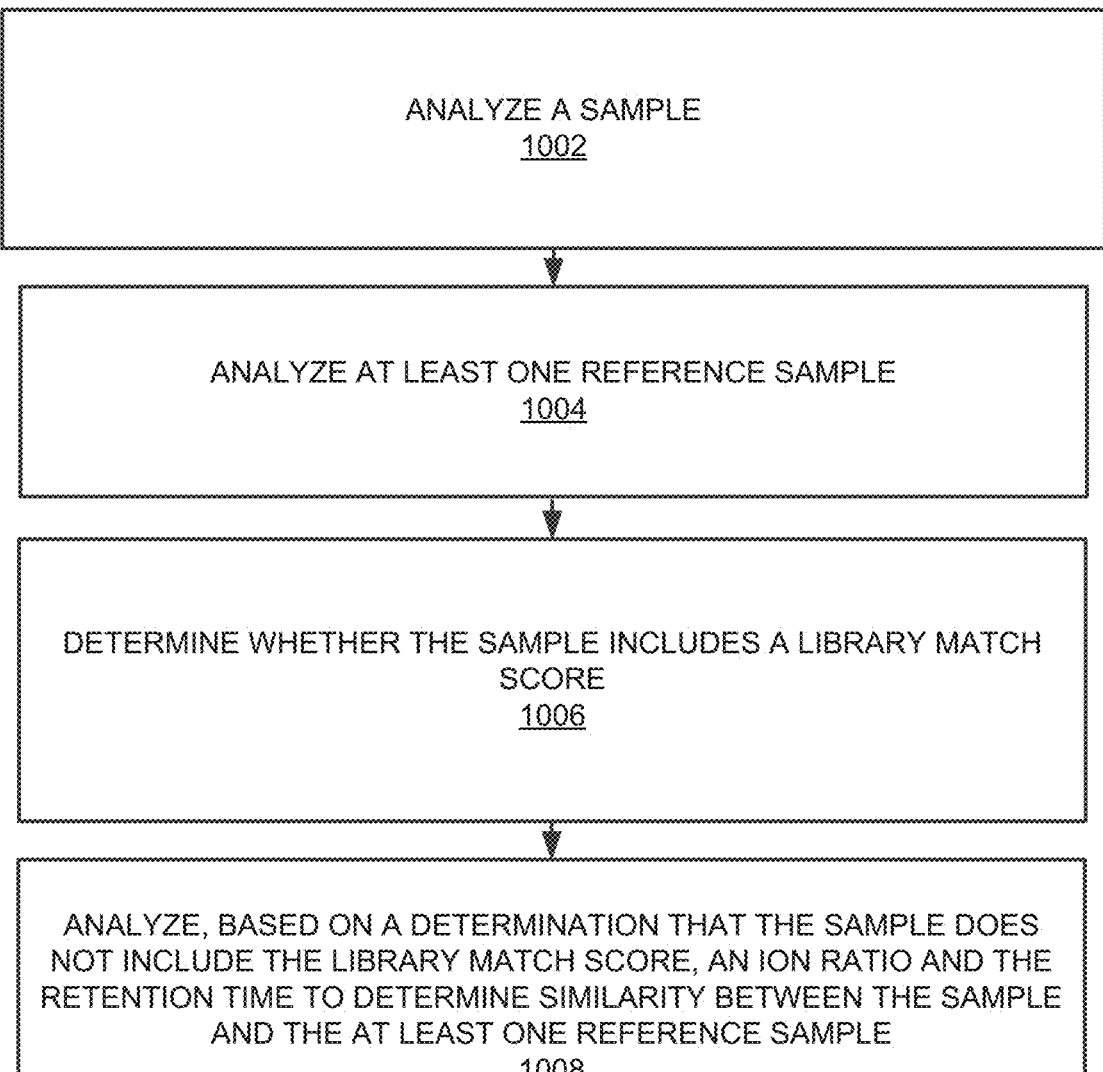
FIG. 10 illustrates a flowchart of an example method for fingerprint similarity based sample analysis in accordance with an example of the present disclosure.

FIGS. 9-11 respectively illustrate an example block diagram 900, a flowchart of an example method 1000, and a further example block diagram 1100 for fingerprint similarity based sample analysis, according to examples. The block diagram 900, the method 1000, and the block diagram 1100 may be implemented on the apparatus 100 described above with reference to FIG. 1 by way of example and not of limitation. The block diagram 900, the method 1000, and the block diagram 1100 may be practiced in other apparatus. In addition to showing the block diagram 900, FIG. 9 shows hardware of the apparatus 100 that may execute the instructions of the block diagram 900. The hardware may include a processor 902, and a memory 904 storing machine readable instructions that when executed by the processor cause the processor to perform the instructions of the block diagram 900. The memory 904 may represent a non-transitory computer readable medium. FIG. 10 may represent an example method for fingerprint similarity based sample analysis, and the steps of the method. FIG. 11 may represent a non-transitory computer readable medium 1102 having stored thereon machine readable instructions to provide fingerprint similarity based sample analysis according to an example. The machine readable instructions, when executed, cause a processor 1104 to perform the instructions of the block diagram 1100 also shown in FIG. 11.

The processor 902 of FIG. 9 and/or the processor 1104 of FIG. 11 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1102 of FIG. 11), such as hardware storage devices (e.g., RAM (random access memory), ROM (read only memory), EPROM (erasable, programmable ROM), EEPROM (electrically erasable, programmable ROM), hard drives, and flash memory). The memory 904 may include a RAM, where the machine readable instructions and data for a processor may reside during runtime.

Referring to FIGS. 1-9, and particularly to the block diagram 900 shown in FIG. 9, the memory 904 may include instructions 906 to analyze a sample 104.

The processor 902 may fetch, decode, and execute the instructions 908 to analyze at least one reference sample 106.

The processor 902 may fetch, decode, and execute the instructions 910 to determine whether the sample 104 includes a library match score 110.

The processor 902 may fetch, decode, and execute the instructions 912 to analyze, based on a determination that the sample 104 includes the library match score 110, the library match score 110 and a retention time 114 to determine similarity 116 between the sample 104 and the at least one reference sample 106.

Referring to FIGS. 1-8 and 10, and particularly FIG. 10, for the method 1000, at block 1002, the method may include analyzing a sample 104.

At block 1004, the method may include analyzing at least one reference sample 106.

At block 1006, the method may include determining whether the sample 104 includes a library match score 110.

At block 1008, the method may include analyzing, based on a determination that the sample 104 does not include the library match score 110, an ion ratio 120 and the retention time 114 to determine similarity 116 between the sample 104 and the at least one reference sample 106.

Referring to FIGS. 1-8 and 11, and particularly FIG. 11, for the block diagram 1000, the non-transitory computer readable medium 1002 may include instructions 1006 to determine whether a sample includes a library match score.

The processor 1104 may fetch, decode, and execute the instructions 1108 to analyze, based on a determination that the sample does not include the library match score, an ion ratio and a retention time to determine similarity between the sample and at least one reference sample.

The processor 1104 may fetch, decode, and execute the instructions 1110 to analyze, based on a determination that the sample includes the library match score, the library match score and the retention time to determine similarity between the sample and the at least one reference sample.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A mass spectrometry (MS) instrument configured to improve compound identification accuracy, the instrument comprising:
   a reference sample type analyzer, executed by at least one hardware processor, to:
   analyze a sample using spectral data acquired by the MS instrument;
   analyze at least one reference sample;
   a library match score analyzer, executed by the at least one hardware processor, to:
   determine whether the sample includes a library match score;
   a library match score and retention time analyzer, executed by the at least one hardware processor, to:
   analyze, based on a determination that the sample includes the library match score, the library match score and a retention time to determine similarity between the sample and the at least one reference sample;

an ion ratio and retention time analyzer, executed by the at least one hardware processor, to:
   analyze, based on a determination that the sample does not include the library match score, an ion ratio and the retention time to determine the similarity between the sample and the at least one reference sample; and
   a memory storing machine readable instructions, the machine readable instructions, when executed by the at least one hardware processor, cause the at least one hardware processor to:
   automatically generate, based on a determination that the similarity between the sample and the at least one reference sample exceeds a user-defined similarity threshold, a selected ion monitoring (SIM) acquisition technique to monitor, on a gas chromatography-mass spectrometry (GCMS) subsystem, characteristic compounds retained in the sample;
   trigger, based on a determination that the sample is similar to the at least one reference sample, an alert to enable automated control of the GCMS subsystem; and
   automatically control, based on the triggered alert and the generated SIM acquisition technique, operation of the GCMS subsystem to monitor the characteristic compounds retained in the sample.

2. The MS instrument according to claim 1, further comprising:
   a similarity analyzer, executed by the at least one hardware processor, to:
   determine, based on cosine similarity, the similarity between the sample and the at least one reference sample.

3. The MS instrument according to claim 1, further comprising:
   a similarity analyzer, executed by the at least one hardware processor, to:
   determine, based on entropy similarity, the similarity between the sample and the at least one reference sample.

4. The MS instrument according to claim 1, wherein the library match score and retention time analyzer is executed by the at least one hardware processor to said analyze, based on the determination that the sample includes the library match score, the library match score and the retention time to said determine the similarity between the sample and the at least one reference sample by:
   determining, for a single reference sample entry, a response area of a compound associated with the single reference sample entry.

5. The MS instrument according to claim 1, wherein the library match score and retention time analyzer is executed by the at least one hardware processor to said analyze, based on the determination that the sample includes the library match score, the library match score and the retention time to said determine the similarity between the sample and the at least one reference sample by:
   determining, for a plurality of reference sample entries, an average response area of a compound associated with the plurality of reference sample entries.

6. The MS instrument according to claim 1, wherein the ion ratio and retention time analyzer is executed by the at least one hardware processor to said analyze, based on the determination that the sample does not include the library match score, the ion ratio and the retention time to said determine the similarity between the sample and the at least one reference sample by:

determining, for a single reference sample entry, a response area of a compound associated with the single reference sample entry.

7. The MS instrument according to claim 1, wherein the ion ratio and retention time analyzer is executed by the at least one hardware processor to said analyze, based on the determination that the sample does not include the library match score, the ion ratio and the retention time to said determine the similarity between the sample and the at least one reference sample by:

determining, for a plurality of reference sample entries, an average response area of a compound associated with the plurality of reference sample entries.

8. A method for fingerprint similarity based sample analysis, the method comprising:

analyzing, by at least one hardware processor, a sample;

analyzing, by the at least one hardware processor, at least one reference sample;

determining, by the at least one hardware processor, whether the sample includes a library match score;

analyzing, by the at least one hardware processor, based on a determination that the sample does not include the library match score, an ion ratio and a retention time to determine similarity between the sample and the at least one reference sample;

automatically generating, by the at least one hardware processor, based on a determination that the similarity between the sample and the at least one reference sample exceeds a user-defined similarity threshold, a selected ion monitoring (SIM) acquisition technique to monitor, on a gas chromatography-mass spectrometry (GCMS) subsystem, characteristic compounds retained in the sample;

triggering, by the at least one hardware processor, based on a determination that the sample is similar to the at least one reference sample, an alert to enable automated control of the GCMS subsystem; and automatically controlling, by the at least one hardware processor, based on the triggered alert and the generated SIM acquisition technique, operation of the GCMS subsystem to monitor the characteristic compounds retained in the sample.

9. The method according to claim 8, further comprising:

analyzing, by the at least one hardware processor, based on a determination that the sample includes the library match score, the library match score and the retention time to said determine the similarity between the sample and the at least one reference sample.

10. The method according to claim 8, further comprising:

determining, by the at least one hardware processor, based on cosine similarity, the similarity between the sample and the at least one reference sample.

11. The method according to claim 8, further comprising:

determining, by the at least one hardware processor, based on entropy similarity, the similarity between the sample and the at least one reference sample.

12. The method according to claim 8, wherein the analyzing, by the at least one hardware processor, based on the determination that the sample does not include the library match score, the ion ratio and the retention time to said determine the similarity between the sample and the at least one reference sample, further comprises:

determining, by the at least one hardware processor, for a single reference sample entry, a response area of a compound associated with the single reference sample entry.

13. The method according to claim 8, wherein the analyzing, by the at least one hardware processor, based on the determination that the sample does not include the library match score, the ion ratio and the retention time to said determine the similarity between the sample and the at least one reference sample, further comprises:

determining, by the at least one hardware processor, for a plurality of reference sample entries, an average response area of a compound associated with the plurality of reference sample entries.

14. The method according to claim 9, wherein the analyzing, by the at least one hardware processor, based on the determination that the sample includes the library match score, the library match score and the retention time to said determine the similarity between the sample and the at least one reference sample, further comprises:

determining, by the at least one hardware processor, for a single reference sample entry, a response area of a compound associated with the single reference sample entry.

15. The method according to claim 9, wherein the analyzing, by the at least one hardware processor, based on the determination that the sample includes the library match score, the library match score and the retention time to said determine the similarity between the sample and the at least one reference sample, further comprises:

determining, by the at least one hardware processor, for a plurality of reference sample entries, an average response area of a compound associated with the plurality of reference sample entries.

16. A non-transitory computer readable medium having stored thereon machine readable instructions, the machine readable instructions, when executed by at least one hardware processor, cause the at least one hardware processor to:

determine whether a sample includes a library match score;

analyze, based on a determination that the sample does not include the library match score, an ion ratio and a retention time to determine similarity between the sample and at least one reference sample;

analyze, based on a determination that the sample includes the library match score, the library match score and the retention time to determine the similarity between the sample and the at least one reference sample;

automatically generate, based on a determination that the similarity between the sample and the at least one reference sample exceeds a user-defined similarity threshold, a selected ion monitoring (SIM) acquisition technique to monitor, on a gas chromatography-mass spectrometry (GCMS) subsystem, characteristic compounds retained in the sample;

trigger, based on a determination that the sample is similar to the at least one reference sample, an alert to enable automated control of the GCMS subsystem; and automatically control, based on the triggered alert and the generated SIM acquisition technique, operation of the GCMS subsystem to monitor the characteristic compounds retained in the sample.

17. The non-transitory computer readable medium according to claim 16, wherein the machine readable instructions, when executed by the at least one hardware processor, further cause the at least one hardware processor to:

determine, based on cosine similarity, the similarity between the sample and the at least one reference sample.

18. The non-transitory computer readable medium according to claim 16, wherein the machine readable instructions, when executed by the at least one hardware processor, further cause the at least one hardware processor to:

determine, based on entropy similarity, the similarity between the sample and the at least one reference sample.

19. The non-transitory computer readable medium according to claim 16, wherein the machine readable instructions to said analyze, based on the determination that the sample does not include the library match score, the ion ratio and the retention time to said determine similarity between the sample and at least one reference sample, and analyze, based on the determination that the sample includes the library match score, the library match score and the retention time to said determine the similarity between the sample and the at least one reference sample, when executed by the at least one hardware processor, further cause the at least one hardware processor to:

determine, for a single reference sample entry, a response area of a compound associated with the single reference sample entry; and determine, for a plurality of reference sample entries, an average response area of the compound associated with the plurality of reference sample entries.

\* \* \* \* \*